(12) United States Patent
Myers et al.

(10) Patent No.: US 7,733,945 B2
(45) Date of Patent: Jun. 8, 2010

(54) SPREAD SPECTRUM WITH DOPPLER OPTIMIZATION

(75) Inventors: Theodore J. Myers, La Jolla, CA (US); Daniel Thomas Werner, San Diego, CA (US)

(73) Assignee: On-Ramp Wireless, Inc., San Diego, CA (US)

( * ) Notice: Subject to any disclaimer, the term of this patent is extended or adjusted under 35 U.S.C. 154(b) by 0 days.

(21) Appl. No.: 12/472,642

(22) Filed: May 27, 2009

(65) Prior Publication Data

US 2009/0238248 A1    Sep. 24, 2009

Related U.S. Application Data

(63) Continuation-in-part of application No. 12/276,971, filed on Nov. 24, 2008, and a continuation-in-part of application No. 12/189,619, filed on Aug. 11, 2008, (Continued)

(60) Provisional application No. 61/037,522, filed on Mar. 18, 2008.

(51) Int. Cl.
H04B 1/707    (2006.01)
(52) U.S. Cl. ...................................... 375/149
(58) Field of Classification Search ............... 375/130, 375/140, 142, 147, 150
See application file for complete search history.

(56) References Cited

U.S. PATENT DOCUMENTS 4,774,715 A    9/1988    Messenger (Continued)

FOREIGN PATENT DOCUMENTS

KR    20020001071    1/2002

(Continued)

OTHER PUBLICATIONS

Persson, et al., "A Segmented Matched Filter for CDMA Code Synchronization in Systems with Doppler Frequency Offset," University of Saskatchewan, Canada, 2001 IEEE, Retrieved from Internet: http://www.ece.usask.ca/eceresearch/faculty/ded632/files/Globecom_BWS07.pdf.

(Continued)

*Primary Examiner*—Kevin M Burd
(74) *Attorney, Agent, or Firm*—Foley & Lardner LLP

(57) ABSTRACT

A method of compensating for doppler phase errors includes receiving a signal at a receiver wherein the signal is spread using a pseudo-noise code, dividing the signal into a plurality of smaller coherent units and then compensating for induced doppler phase errors by analyzing the plurality of smaller coherent units. Analysis may include producing a plurality of coherent sums by summing across the smaller coherent units and then summing non-coherently the plurality of coherent sums. Analysis may also include demodulating a symbol from the smaller coherent units. A modulation technique may be selected from a plurality of modulation techniques and then be used to encode and transmit a symbol stream.

12 Claims, 30 Drawing Sheets

Related U.S. Application Data now Pat. No. 7,593,383, and a continuation-in-part of application No. 12/189,609, filed on Aug. 11, 2008, and a continuation-in-part of application No. 12/189,505, filed on Aug. 11, 2008, now Pat. No. 7,526,013, and a continuation-in-part of application No. 12/189,533, filed on Aug. 11, 2008, now Pat. No. 7,593,452, application No. 12/472,642, which is a continuation-in-part of application No. 12/345,267, filed on Dec. 29, 2008, which is a continuation-in-part of application No. 12/189,505, filed on Aug. 11, 2008, now Pat. No. 7,526,013, and a continuation-in-part of application No. 12/189,533, filed on Aug. 11, 2008, now Pat. No. 7,593,452, and a continuation-in-part of application No. 12/189,609, filed on Aug. 11, 2008, and a continuation-in-part of application No. 12/189,619, filed on Aug. 11, 2008, now Pat. No. 7,593,383, application No. 12/472,642, which is a continuation-in-part of application No. 12/345,374, filed on Dec. 29, 2008, and a continuation-in-part of application No. 12/189,505, filed on Aug. 11, 2008, now Pat. No. 7,526,013, and a continuation-in-part of application No. 12/189,533, filed on Aug. 11, 2008, now Pat. No. 7,593,452, and a continuation-in-part of application No. 12/189,609, filed on Aug. 11, 2008, and a continuation-in-part of application No. 12/189,619, filed on Aug. 11, 2008, now Pat. No. 7,593,383.

(56) References Cited

U.S. PATENT DOCUMENTS

| | | |
|---|---|---|
| 5,161,153 A | 11/1992 | Westmore |
| 5,297,162 A | 3/1994 | Lee et al. |
| 5,353,300 A | 10/1994 | Lee et al. |
| 5,359,624 A | 10/1994 | Lee et al. |
| 5,392,287 A | 2/1995 | Tiedemann et al. |
| 5,404,375 A | 4/1995 | Kroeger et al. |
| 5,596,330 A | 1/1997 | Yokev et al. |
| 5,604,732 A | 2/1997 | Kim et al. |
| 5,691,974 A | 11/1997 | Zehavi et al. |
| 5,940,771 A | 8/1999 | Gollnick et al. |
| 5,960,028 A | 9/1999 | Okamoto et al. |
| 6,011,974 A | 1/2000 | Cedervall et al. |
| 6,069,915 A | 5/2000 | Hulbert |
| 6,091,759 A | 7/2000 | Rotstein et al. |
| 6,108,364 A | 8/2000 | Weaver, Jr. et al. |
| 6,108,565 A | 8/2000 | Scherzer |
| 6,111,911 A | 8/2000 | Sanderford, Jr. et al. |
| 6,134,262 A | 10/2000 | Kitade et al. |
| 6,157,631 A | 12/2000 | Rohani |
| 6,226,282 B1 | 5/2001 | Chung |
| 6,256,337 B1 | 7/2001 | Hendrickson et al. |
| 6,278,725 B1 | 8/2001 | Rouphael et al. |
| 6,282,229 B1 | 8/2001 | Aoyama |
| 6,363,106 B1 | 3/2002 | Popovic et al. |
| 6,459,402 B1 | 10/2002 | Tsunehara et al. |
| 6,493,376 B1 | 12/2002 | Harms et al. |
| 6,590,886 B1 | 7/2003 | Easton et al. |
| 6,597,675 B1 | 7/2003 | Esmailzadeh et al. |
| 6,625,197 B1 | 9/2003 | Lundby et al. |
| 6,628,675 B1 | 9/2003 | Neufeld |
| 6,647,077 B1 | 11/2003 | Shan et al. |
| 6,674,765 B1 | 1/2004 | Chuah et al. |
| 6,701,132 B1 | 3/2004 | Fukuzawa et al. |
| 6,704,547 B2 | 3/2004 | Kuwahara et al. |
| 6,724,810 B1 | 4/2004 | Chapman |
| 6,731,614 B1 | 5/2004 | Ohlson et al. |
| 6,748,224 B1 | 6/2004 | Chen et al. |
| 6,765,953 B1 * | 7/2004 | Harms et al. ............... 375/150 |
| 6,810,078 B2 | 10/2004 | Bradley |
| 7,280,581 B2 | 2/2005 | Soma |
| 6,882,682 B1 | 4/2005 | Tanaka |
| 6,889,055 B1 | 5/2005 | Neufeld |
| 6,895,036 B2 | 5/2005 | Medlock |
| 6,900,753 B2 | 5/2005 | Tsunehara et al. |
| 6,952,440 B1 | 10/2005 | Underbrink |
| 6,970,518 B2 | 11/2005 | Kuffner et al. |
| 7,020,180 B2 * | 3/2006 | Challa et al. ............... 375/147 |
| 7,027,485 B2 | 4/2006 | Yue |
| 7,046,717 B2 | 5/2006 | Kanterakis et al. |
| 7,050,485 B2 | 5/2006 | Yue |
| 7,076,008 B2 | 7/2006 | Jeong |
| 7,085,246 B1 | 8/2006 | LaRosa et al. |
| 7,113,496 B2 | 9/2006 | Koo et al. |
| 7,206,797 B2 | 4/2007 | Gressel et al. |
| 7,218,901 B1 | 5/2007 | Mobley et al. |
| 7,239,867 B2 | 7/2007 | Kotzin et al. |
| 7,302,009 B2 | 11/2007 | Walton et al. |
| 7,302,276 B2 | 11/2007 | Bernhardsson et al. |
| 7,321,601 B2 | 1/2008 | Rogerson et al. |
| 7,453,855 B1 | 11/2008 | Madhow |
| 7,477,694 B2 | 1/2009 | Sanderford et al. |
| 7,526,013 B1 | 4/2009 | Myers |
| 2001/0004373 A1 | 6/2001 | Hirata |
| 2001/0041536 A1 | 11/2001 | Hasegawa |
| 2002/0021683 A1 | 2/2002 | Holtzman et al. |
| 2002/0159409 A1 | 10/2002 | Wolfe et al. |
| 2003/0026219 A1 | 2/2003 | Moon et al. |
| 2003/0031196 A1 | 2/2003 | Nishimura |
| 2003/0054813 A1 | 3/2003 | Riley et al. |
| 2003/0081660 A1 | 5/2003 | King et al. |
| 2003/0152136 A1 | 8/2003 | Roman |
| 2004/0085920 A1 | 5/2004 | Sezgin et al. |
| 2004/0086027 A1 * | 5/2004 | Shattil ............... 375/146 |
| 2004/0091034 A1 | 5/2004 | Shiu et al. |
| 2004/0202137 A1 | 10/2004 | Gerakoulis |
| 2004/0213184 A1 | 10/2004 | Hu et al. |
| 2004/0229640 A1 | 11/2004 | Wang et al. |
| 2004/0252668 A1 | 12/2004 | Ozukturk et al. |
| 2004/0252684 A1 | 12/2004 | Evans et al. |
| 2005/0025111 A1 | 2/2005 | Soma |
| 2005/0058151 A1 | 3/2005 | Yeh |
| 2005/0058153 A1 | 3/2005 | Santhoff et al. |
| 2005/0105597 A1 | 5/2005 | Hwang et al. |
| 2005/0105598 A1 | 5/2005 | Kaewell |
| 2005/0123025 A1 | 6/2005 | Sorrells et al. |
| 2005/0124374 A1 | 6/2005 | Riley et al. |
| 2005/0157692 A1 | 7/2005 | Gerakoulis |
| 2005/0162311 A1 | 7/2005 | Dooley et al. |
| 2005/0208961 A1 | 9/2005 | Willenegger |
| 2005/0254467 A1 | 11/2005 | Li et al. |
| 2005/0254557 A1 | 11/2005 | Ozluturk et al. |
| 2006/0033658 A1 | 2/2006 | Camp, Jr. |
| 2006/0056375 A1 | 3/2006 | Koyama et al. |
| 2006/0072614 A1 | 4/2006 | Ogiso et al. |
| 2006/0128414 A1 | 6/2006 | Shida et al. |
| 2006/0153142 A1 | 7/2006 | Kang et al. |
| 2006/0242323 A1 | 10/2006 | Sanderford et al. |
| 2006/0245472 A1 | 11/2006 | Pan et al. |
| 2006/0274822 A1 | 12/2006 | Stahlberg et al. |
| 2006/0276987 A1 | 12/2006 | Bolander et al. |
| 2007/0014338 A1 | 1/2007 | Ozluturk et al. |
| 2007/0066320 A1 | 3/2007 | Padovani et al. |
| 2007/0076682 A1 | 4/2007 | Kim et al. |
| 2007/0140386 A1 | 6/2007 | Howard |
| 2007/0147337 A1 | 6/2007 | Bosch et al. |
| 2007/0195866 A1 * | 8/2007 | Seibert et al. ............... 375/150 |
| 2007/0211786 A1 | 9/2007 | Shattil |
| 2007/0258508 A1 | 11/2007 | Werb et al. |
| 2007/0274267 A1 | 11/2007 | Tiedemann et al. |
| 2007/0276987 A1 | 11/2007 | Luo et al. |
| 2007/0286142 A1 | 12/2007 | Prakash et al. |

| | | | |
|---|---|---|---|
| 2008/0032625 | A1 | 2/2008 | Cheung et al. |
| 2008/0036589 | A1 | 2/2008 | Werb et al. |
| 2008/0037431 | A1 | 2/2008 | Werb et al. |
| 2008/0037454 | A1 | 2/2008 | Werb et al. |
| 2008/0037569 | A1 | 2/2008 | Werb et al. |
| 2008/0040509 | A1 | 2/2008 | Werb et al. |
| 2008/0062951 | A1 | 3/2008 | Kanterakis et al. |
| 2008/0089447 | A1 | 4/2008 | Usuda et al. |
| 2008/0130482 | A1 | 6/2008 | Dabak |
| 2008/0130731 | A1 | 6/2008 | Shiu et al. |
| 2008/0153483 | A1 | 6/2008 | Abu-Amara |
| 2008/0182511 | A1 | 7/2008 | Adkins et al. |
| 2008/0232330 | A1 | 9/2008 | Lee et al. |
| 2008/0267126 | A1 | 10/2008 | Vujcic et al. |

FOREIGN PATENT DOCUMENTS

| | | |
|---|---|---|
| KR | 10200331124 | 4/2003 |
| KR | 20050022433 | 3/2005 |
| WO | WO-02/09320 | 1/2002 |
| WO | WO 2005/010214 | 2/2005 |

OTHER PUBLICATIONS

Townsend, B. et al., "LI Carrier Phase Multipath Error Reduction Using MEDLL Technology," NovAtel Communications Ltd, Canada, Sep. 1995, Retrieved from Internet: http://www.novatel.ca/Documents/Papers/File42.pdf.

Pottie,"Wireless Multiple Access Adaptive Communications Techniques", retrieved from Internet: http://www.ec.ucla.edu/~pottie/papers/encyc1.pdf.

Zhang, "Design and Implementation of an Optical Code Division Multiple Access System Combined with Dense Wavelength Division Multiplexing", retrieved from Internet: http://www.inue.uni-stuttgart.de/publications/pub_2003/zhang_dissertation.pdf, Dec. 5, 2003.

Prasad, "An Overview of CDMA Evolution Toward Wideband CDMA", retrieved from Internet: http://www.tfe.umu.se/courses/systemteknik/Telesystem/Prasad.pdf, 1998.

Li, "Physical Layer Design for a Spread Spectrum Wireless LAN", retrieved from Internet: http://scholar.lib.vt.edu/theses/public/etd-3014171099642831/etd.pdf, Sep. 12, 1996.

Cao et al., "Modelling and Performance Analysis of the Distributed Scheduler in IEEE 802.16 Mesh Mode." In: MobiHoc'05 [online], May 25-27, 2005, p. 78-89, (retrieved on Dec. 3, 2008. Retrieved from the Internet: <URL: http://lion.cs.uiuc.edu/group_seminar_slides/p78-cao.pdf>.

Bayer et al., "Improving the Performance of the Distributed Scheduler in IEEE 802.16 Mesh Networks." In: IEEE vehicular technology conference (VTC 2007-Spring) [online], 2007, p. 1-5, [retrieved on Dec. 3, 2008]. Retrieved from the Internet: <URL: http://www.staff.city.ac.uk/~veselin/publications/Bayer_VTC07.pdf>. Citation available at <URL: http://portal.acm.org/citation.cfm?id=1413939.1413942&coll=GUIDE&dl=GUIDE>.

Zhao, Y.,"Mobile Phone Location Determination and Its Impact on Intelligent Transportation Systems."In: IEEE Transactions on Intelligent Transportation Systems [online], vol. 1, No. 1, Mar. 2000, p. 55-64, [retrieved on Nov. 20, 2008]. Retrieved from the Internet: <URL: http://www.ss.fpp.edu/~fdimc/laboratorijske_vale/Inteligientni_transportni_sistemi/Literatura_za_sirjenje_obzorja/ITS_mobile_phone_location_determination.pdf>.

Sunay et al., "Mobile Location Tracking in DS CDMA Networks Using Forward Link Time Difference of Arrival and Its Application to Zone-Based Billing." In: Global Telecommunications Conference, 1999. Globecom '99 [online], vol. 1a, p. 143-147, [retrieved on Nov. 20, 2008]. Retrieved from the Internet: <URL: http://portal.ku.edu.tr/~osunay/papers/GCOM99-geolocation.pdf>. Citation on the Internet: <URL: http://ieeexplore.ieee.org/xpl/freeabs_all.jsp?arnumber=831624>.

Non-Final Office Action dated Jun. 18, 2009 for U.S. Appl. No. 12/189,609.

Final Office Action dated Jul. 22, 2009 for U.S. Appl. No. 12/189,609.

Notice of Allowance dated Jun. 26, 2009 for U.S. Appl. No. 12/189,619.

Notice of Allowance dated Jun. 3, 2009, first received Jun. 4, 2009, for U.S. Appl. No. 12/189,533.

Hamalainen, J., "Cellular Network Planning and Optimization Part VI: WCDMA Basics", Helsinki University of Technology Communications and Networking Department, Jan. 24, 2008. [Retrieved on Jan. 27, 2009], Retrieved from the Internet <URL: http://www.comlab.hut.fi/studies/3275/Cellular_network_planning_and_optimization_part6.pdf.

Wang et al, "Error Statistics of Closed-Loop Power Control in Multirate DS-CDMA Cellular Systems", IEEE Xplore, [Retreived on Feb. 23, 2009], Retrieved from the Internet <URL: http://ieeexplore.ieee.org/Xplore/login.jsp?url=/iel5/7793/21424/00993355.pdf?arnumber=993355,>, 2002.

Buzzi et al., "Joint Receiver and Transmitter Optimization for Energy-Efficient CDMA Communications", To Appear in IEEE JSAC—Special Issue on Multiuser Detection for Advanced Communication Systems and Networks, Presented at 2007 European Wireless Conference and at 2007 IEEE International Symposium on Information Theory, [Retreived on Feb. 25, 2009], Retrieved from the Internet <URL: http://arxiv.org/PS_cache/arxiv/pdf/0712/0712.1339v1.pdf>, 2007.

Yang et al, "Software-Defined-Radio-Assisted Adaptive Broadband Frequency Hopping Multicarrier DS-CDM", IEEE Communications Magazine, [Retrievd on Feb. 25, 2009], Retrieved from the Internet <URL: http://ieeexplore.ieee.org/Xplore/login.jsp?url=/iel5/35/21325/00989783.pdf?arnumber=989783>, Mar. 2002.

Zhao et al., "Joint Rate and Power Adaptation for Radio Resource Management in Uplink Wideband Code Division Multiple Access Systems", Institution of Engineering and Technology (IET) Communications, vol. 2, No. 4, pp. 562-572, [Retreived on Feb. 25, 2009], Retrieved from the Internet <URL: http://ieeexplore.ieee.org/Xplore/login.jsp?url=/iel5/4105970/4493350/04493358.pdf?arnumber=4493358>, Jan. 2007.

Xu, Liang, "Dynamic Fair Scheduling with QoS Constraints in Multimedia Wideband CDMA Cellular Networks", IEEE Transactions on Wireless Communications, vol. 3, No. 1; [Retreived on Feb. 25, 2009], Retrieved from the Internet <URL: http://ieeexplore.ieee.org./xplore/login.jsp?url=/ielx5/7693/28152/01259400.pdf?arnumber=1259400, Jan. 2004.

Office Action mailed Sep. 4, 2009 for U.S. Appl. No. 12/189,609.

Office Action mailed Sep. 4, 2009 for U.S. Appl. No. 12/345,374.

International Search Report and Written Opinion for PCT/US/2009/036766 mailed Oct. 28, 2009.

International Search Report and Written Opinion for PCT/US2009/036743 mailed Oct. 28, 2009.

Lee et al., "CDMA Systems Engineering Handbook," Artech House, 1998, pp. 335-423.

Final Office Action for U.S. Appl. No. 12/345,374 dated Nov. 10, 2009.

Non-final Office Action received on U.S. Appl. No. 12/345,374 dated Feb. 17, 2010. (091721-0108).

Notice of Allowance received on U.S. Appl. No. 12/483,722 dated Feb. 18, 2010. (091721-0117).

US Office Action on received on U.S. Appl. No. 12/483,722 dated Jan. 11, 2010. (091721-0117).

Mischa Schwartz, Mobile Wireless Communications, pp. 327 (Cambridge University Press 2005), retrieved from URL: http://bit.ly/9BYDhy.

Andrew Richardson, WCDMA Design Handbook, pp. 268 & 277(Cambridge University Press 2005), retrieved from URLs: http://bit.ly/buMIWO; http://bit.ly/9QcaED.

Notice of Allowance received for U.S. Appl. No. 12/345,374 on dated Mar. 31, 2010. (091721-0108).

Notice of Allowance received for U.S. Appl. No. 12/189,609 on dated Mar. 23, 2010. (091721-0103).

Non-final Office Action received for U.S. Appl. No. 12/276,971 dated Apr. 13, 2010. (091721-0109).

* cited by examiner

SPREAD SPECTRUM WITH DOPPLER OPTIMIZATION

CROSS-REFERENCE TO RELATED PATENT APPLICATIONS

The present application is a continuation-in-part application of U.S. patent application Ser. No. 12/189,609, entitled "Random Phase Multiple Access Communication Interface System and Method," filed Aug. 11, 2008, which claims priority to U.S. Patent Application No. 61/037,522, filed Mar. 18, 2008. The present application is also a continuation-in-part application of U.S. patent application Ser. No. 12/189,619, entitled "Uplink Transmitter in a Random Phase Multiple Access Communication System," filed Aug. 11, 2008, which claims priority to U.S. Patent Application No. 61/037,522, filed Mar. 18, 2008. The present application is also a continuation-in-part application of U.S. patent application Ser. No. 12/189,533, entitled "Despreading Spread Spectrum Data," filed Aug. 11, 2008, which claims priority to U.S. Patent Application No. 61/037,522, filed Mar. 18, 2008. The present application is also a continuation-in-part application of U.S. patent application Ser. No. 12/189,505, entitled "Tag Communications with Access Point," filed Aug. 11, 2008, which claims priority to U.S. Patent Application No. 61/037,522, filed Mar. 18, 2008. The present application is also a continuation-in-part application of U.S. patent application Ser. No. 12/276,971, entitled "Slotted Mode Acquisition," filed on Nov. 24, 2008, which claims priority to U.S. Patent Application No. 61/037,522, filed Mar. 18, 2008. The present application is also a continuation-in-part application of U.S. patent application Ser. No. 12/345,267, entitled "Random Phase Multiple Access System with Location Tracking," filed Dec. 29, 2008, which claims priority to U.S. patent application Ser. Nos. 12/189,505, 12/189,533, 12/189,609, and 12/189,619, all of which were filed on Aug. 11, 2008, and which also claims priority to U.S. Patent Application No. 61/037,522, filed Mar. 18, 2008. The present application is also a continuation-in-part application of U.S. patent application Ser. No. 12/345,374, entitled "Random Phase Multiple Access System with Meshing," filed on Dec. 29, 2008, which claims priority to U.S. patent application Ser. Nos. 12/189,505, 12/189,533, 12/189,609, and 12/189,619, all of which were filed on Aug. 11, 2008, and which also claims priority to U.S. Patent Application No. 61/037,522, filed Mar. 18, 2008.

FIELD

Embodiments of the present application relate to the field of communications. More specifically, representative embodiments relate to random phase multiple access communication interface systems and methods.

BACKGROUND

A number of modulation techniques have been developed for facilitating communications in a network where multiple users are present. Such techniques include code division multiple access (CDMA), time division multiple access (TDMA), and frequency division multiple access (FDMA). CDMA is a spread-spectrum technology that uses pseudo-random number sequences to modulate incoming data, multiple transmitters transmitting on the same signal, and orthogonal codes (Walsh codes) to correlate different communication channels. TDMA uses time slots to coordinate multiple uplink transmitters that are transmitting in the same sub-slots. Users transmit in rapid succession, one after the other, each using his/her own time slot, allowing multiple stations to share the same transmission medium (e.g., radio frequency channel) while using only a portion of the total available bandwidth. FDMA allocates different users with different carrier frequencies of the radio spectrum.

In addition to modulation techniques, protocols exist for determining how network devices respond when two devices attempt to use a data channel simultaneously (called a collision). CSMA/CD (Carrier Sense Multiple Access/Collision Detection) is used by Ethernet networks to physically monitor the traffic on the line at participating stations. If no transmission is taking place at the time, the particular station can transmit. If two stations attempt to transmit simultaneously, this causes a collision, which is detected by all participating stations. After a random time interval, the stations that collided attempt to transmit again. If another collision occurs, the time intervals from which the random waiting time is selected are increased step by step. This is known as exponential back off.

Many spread spectrum modulation techniques have difficulty in high doppler environments. Doppler effects on the signal may cause phase problems with the transmission. These problems can result in the loss of communication signals.

SUMMARY

The present invention is directed to a method, device and system that improves reception in the face of phase errors, including phase errors created in high doppler environments. An illustrative embodiment uses a spread spectrum communication system in an environment that may lead to doppler phase errors in received signals. When a doppler induced phase error occurs, demodulation of the spread spectrum signal can still be achieved by analyzing the received signal.

In an illustrative embodiment, compensation for doppler phase errors can be performed by receiving a signal that has been spread using a pseudo-noise (PN) code, dividing the signal into a plurality of smaller coherent units, and then compensating for phase errors by analyzing the plurality of smaller coherent units.

In one illustrative embodiment, the analysis of the smaller coherent units includes summing across each of the plurality of smaller coherent units to produce a plurality of coherent sums. These coherent sums may then be summed non-coherently such that the system can then detect a magnitude of the first signal. One advantage of this system is that it determines the energy of the signal which can be used for further tuning of the receiver. An illustrative embodiment may then base a coherent integration length on the magnitude of the signal. An illustrative embodiment may base a chip timing on the magnitude of the signal. An illustrative embodiment may base a sub-chip timing on the magnitude of the signal. An illustrative embodiment may base an automatic frequency control selection on the magnitude of the signal.

In another illustrative embodiment, the analysis of the smaller coherent units includes receiving a first signal that has been spread using a pseudo-noise (PN) code that may have a random timing offset, dividing the first signal into a plurality of first smaller coherent units, receiving a second signal that has been spread using the pseudo-noise (PN) code that may have a random timing offset, dividing the second signal into a plurality of second smaller coherent units, and compensating for phase errors by analyzing the plurality of first smaller coherent and the plurality of second smaller coherent units. The analysis can proceed by demodulating a symbol from the plurality of first smaller coherent units and the plurality of second smaller coherent units. One illustrative embodiment may use the first unit of the plurality of first smaller coherent units and a last unit of the plurality of second smaller coherent units. Another illustrative embodiment may demodulate a symbol by multiplying the complex conjugate of a unit of the first smaller coherent units with a unit of the second smaller coherent units. In an illustrative embodiment, the first signal may neighbor the second signal in a sequence of symbols.

In an illustrative embodiment, the signal that has been spread using a pseudo-noise code may also have a random timing offset.

In an illustrative embodiment, transmission characteristics may be based on received characteristics. A doppler phase error may be detected on a received signal. A modulation technique may then be selected to encode a symbol stream. The encoded stream may then be transmitted. The modulation techniques may comprise differential binary phase shift keyed modulation or 2-ary modulation. The technique chosen may depend on whether there is a doppler phase error detected or not. A second modulation technique may be chosen from the plurality of modulation techniques. The second modulation technique may then be used to encode a second symbol stream. This allows the system to adapt to possibly changing conditions.

An illustrative device for communicating in a spread spectrum system comprises a receiver that is configured to receive a signal that is spread using a pseudo-noise code, and a processor operatively coupled to the receiver that is configured to divide the signal into a plurality of smaller coherent units and then to compensate for induced doppler phase errors by analyzing the plurality of smaller coherent units. The received signal may also include a random timing offset. The analysis of the plurality of smaller coherent units may comprise summing across each of the smaller coherent units to produce a plurality of coherent sums and then summing non-coherently the plurality of coherent sums to detect a magnitude of the signal.

An illustrative device for communicating in a spread spectrum system comprises a receiver that is configured to receive a first signal that is spread using a pseudo-noise code and a second signal that is spread using the pseudo-noise code, and a processor operatively coupled to the receiver that is configured to divide the first signal into a plurality of first smaller coherent units, to divide the second signal into a plurality of second smaller coherent units, and then to compensate for induced doppler phase errors by analyzing the plurality of first smaller coherent units and the plurality of second smaller coherent units. The received signals may also include a random timing offset. The analysis of the plurality of first smaller coherent units and the plurality of second smaller coherent units may comprise demodulating a first symbol from the plurality of first smaller coherent units and the plurality of second smaller coherent units.

An illustrative spread spectrum communication system comprises at least two components. The first component is a device having a receiver configured to receive a signal, wherein the signal is spread using a predetermined pseudo-noise (PN) code and a processor operatively coupled to the receiver and configured to divide the signal into a plurality of smaller coherent units and to compensate for induced doppler phase errors by analyzing the plurality of smaller coherent units. The second component is an access point in communication with the device, wherein the access point comprises a transmitter configured to transmit the signal. The signal may have a random timing offset. Analyzing the plurality of smaller coherent units may comprise summing across each of the plurality of smaller coherent units to produce a plurality of coherent sums, and then summing non-coherently across the plurality of coherent sums to detect a magnitude of the first signal.

Another illustrative spread spectrum communication system comprises at least two components. The first component is a device having a receiver configured to receive a first signal, wherein the first signal is spread using a predetermined pseudo-noise (PN) code and a second signal, wherein the second signal is spread using a predetermined pseudo-noise code. The device further comprises a processor operatively coupled to the receiver and configured to divide the first signal into a plurality of first smaller coherent units, to divide the second signal into a plurality of second smaller coherent units, and to compensate for induced doppler phase errors by analyzing the plurality of smaller coherent units. The second component is an access point in communication with the device, wherein the access point comprises a transmitter configured to transmit the signal. The first signal and second signal may have a random timing offset. Analyzing the plurality of first smaller coherent units and the plurality of second smaller coherent units may comprise demodulating a first symbol from the plurality of first smaller coherent units and the plurality of second smaller coherent units.

DETAILED DESCRIPTION

Representative embodiments are described below with reference to the accompanying drawings. It should be understood that the following description is intended to describe representative embodiments, and not to limit the invention defined in the appended claims.

In a representative random phase multiple access (RPMA) system with phase noise rejection described herein, two devices are considered. The first device is a node, sometimes called a tag. The second device is an access point (AP) which may communicate with all of the devices in the network and may be connected to other networks. The node and access point communicate using the random phase multiple access protocol described herein. The access point may transmit to a node using the method described below. The node receives the communication and may take action based on the received message. The node may transmit a signal to an access point. The access point then detects and decodes the signal. These four communication operations are described below.

Figure 1:
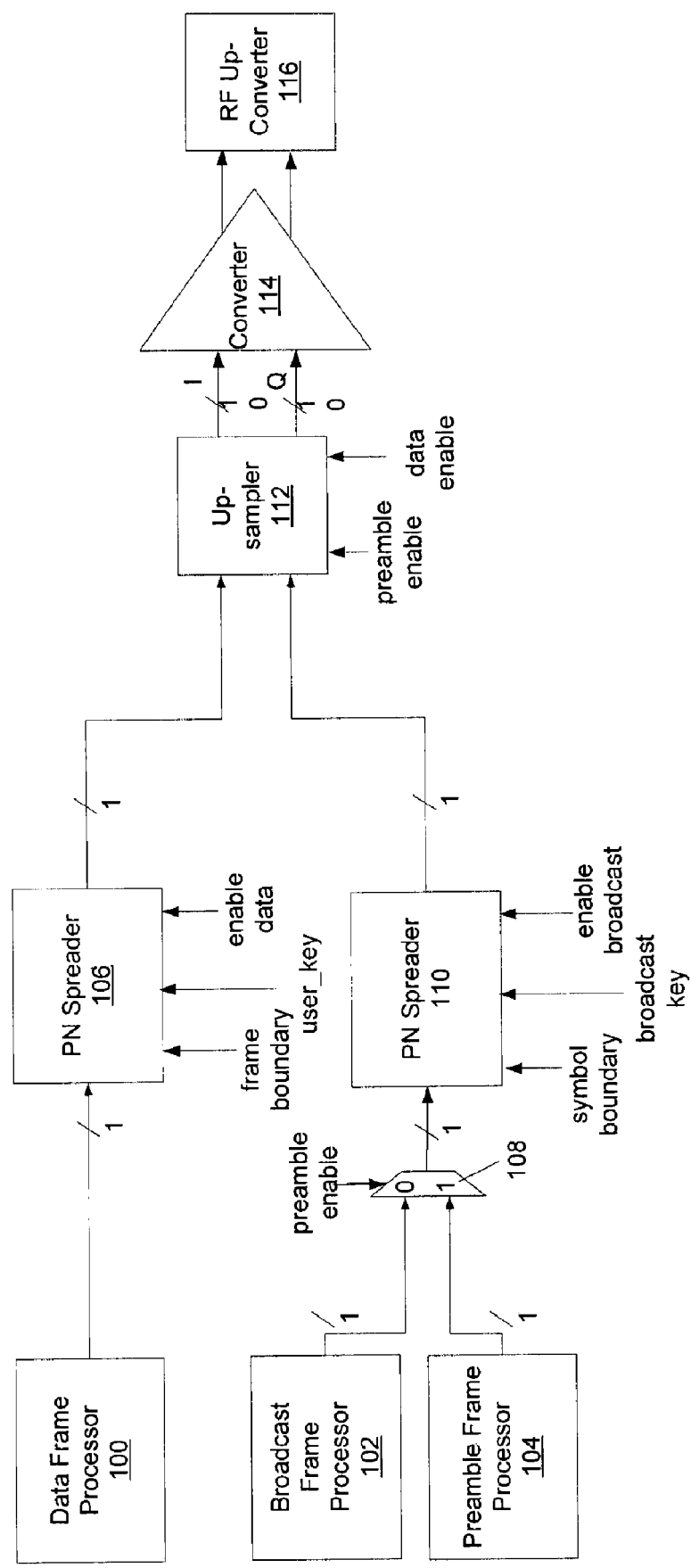
FIG. 1 is a diagram illustrating a downlink transmission model in accordance with a representative embodiment.

In one embodiment, a complex data stream can be created to minimize bandwidth usage. The data channel can exist on a real component of the complex data stream and the broadcast channel can exist on an imaginary component of the complex data stream, or vice versa. FIG. 1 illustrates a downlink transmitter in accordance with a representative embodiment. A data frame can be constructed by a data frame processor 100, a broadcast frame can be constructed by a broadcast frame processor 102, and a broadcast preamble frame can be constructed by a broadcast preamble frame processor 104. The data frame, broadcast frame, and/or broadcast preamble frame can be constructed in accordance with the operations described with reference to FIG. 2. Alternatively, different operations may be performed to construct the frames.

Data frame processor 100 provides a data frame to a PN spreader 106 for spreading. PN spreader 106 can receive a frame boundary input to reset PN spreader 106, a user key input to initialize a state of PN spreader 106, and an enable data input to enable PN spreader 106. For example, the frame boundary input can be an indication that a frame is beginning or ending such that the PN/gold code used by PN spreader 106 is reset for each data frame. The user key input can be tied to a tag identification of a tag which is located in a network of the access point. The user key input (or tag identification) can directly affect the PN/gold code generated, and can allow the tag to decode messages that are targeted for the tag in the downlink. In one embodiment, each frame generated by the access point can be based on a particular user key (or tag identification). The enable data input can window the data channel frame. The enable data input can stay high for the duration of the frame, and may span multiple frames during a downlink slot. In one embodiment, PN spreader 106 can run as long as the enable data input is high. An output of PN spreader 106 can be used as the real component of the complex data stream. Alternatively, the output of PN spreader 106 may be used as the imaginary component of the complex data stream.

The broadcast frame and the broadcast preamble frame are provided to a selector 108 for provision of one of the broadcast frame or the broadcast preamble frame to a PN spreader 110. Selector 108 can receive a preamble enable input to control whether PN spreader 110 receives data from broadcast frame processor 102 or preamble frame processor 104. Pseudo-noise spreader 110 can receive a symbol boundary input to reset PN spreader 110, a broadcast key input to initialize a state of PN spreader 110, and an enable broadcast input to enable PN spreader 110. For example, the symbol boundary input can be an indication that a symbol is beginning or ending such that the gold/PN code used by PN spreader 110 is reset for each symbol. Resetting the gold/PN code after each symbol can make it easier for the tag to acquire the signal broadcast from the access point. Also, by resetting the gold/PN code on every symbol of the broadcast frame, the code space that the tag has to search is reduced. The broadcast key input can be common for a given network, and can directly affect the gold/PN code sequence that is generated. As an example, different access point networks may have different broadcast channel keys which are used as network identifications. The enable broadcast input can stay high for the duration of the symbol, and PN spreader 110 can run as long as the enable broadcast input remains high. An output of PN spreader 110 can be used as the imaginary component of the complex data stream. Alternatively, the output of PN spreader 110 may be used as the real component of the complex data stream.

An output of PN spreader 106 and an output of PN spreader 110 can be provided to an up-sampler 112. In one embodiment, up-sampler 112 can up-sample the received signals to 26 MHz. Alternatively, 40 MHz or any other amount of up-sampling may be performed. Up-sampler 112 has a preamble enable input and a data enable input. The preamble enable input can be activated when selector 108 provides the broadcast preamble frame to PN spreader 110 and the data enable input can be activated when selector 108 provides the broadcast frame to PN spreader 110. In a representative embodiment, activation of the preamble enable input can cause the broadcast preamble to be boosted on the broadcast channel (which can be the imaginary component of the complex data stream). In one embodiment, polyphase filter taps can incorporate a √(2) gain on the broadcast preamble (or √(2) attenuation on transmissions other than the broadcast preamble). Activation of the preamble enable input can also turn off the data channel such that the real component of the complex data stream does not broadcast simultaneously with the broadcast preamble. Activation of the data enable input can cause the broadcast frame to be transmitted on the imaginary component of the complex data stream simultaneously with the data frame on the real component of the complex data stream. As such, when the data enable input is activated, up-sampler 112 can receive the data frame and the broadcast frame. Alternatively, the broadcast preamble may be transmitted on the real component of the complex data stream. In another alternative embodiment, the broadcast preamble may be boosted by simultaneously transmitting the broadcast preamble on both components of the complex data stream.

If the broadcast preamble is being transmitted, up-sampler 112 can provide the up-sampled broadcast preamble to a converter 114. Converter 114 can convert the broadcast preamble from digital to analog for transmission on one or both components of the complex data stream. If the broadcast frame and data frame are being transmitted, up-sampler 112 can provide the up-sampled data frame to converter 114 on the real component (i.e., I channel) of the complex data stream and the up-sampled broadcast frame to converter 114 on the imaginary component (i.e., Q channel) of the complex data stream, or vice versa. Converter 114 can convert the data frame and the broadcast frame from digital to analog for transmission. Converter 114 can also provide the data frame and the broadcast frame to an RF up-converter 116 for combination into the single complex data stream for bandwidth savings during transmission. Radio frequency up-converter 116 can be part of the RF chip. In one embodiment, the I data stream (real component) and the Q data stream (imaginary component) can be independently differentially binary phase shift keyed. As a result, bandwidth can be conserved as the broadcast channel does not have to occupy a side channel.

Figure 2:
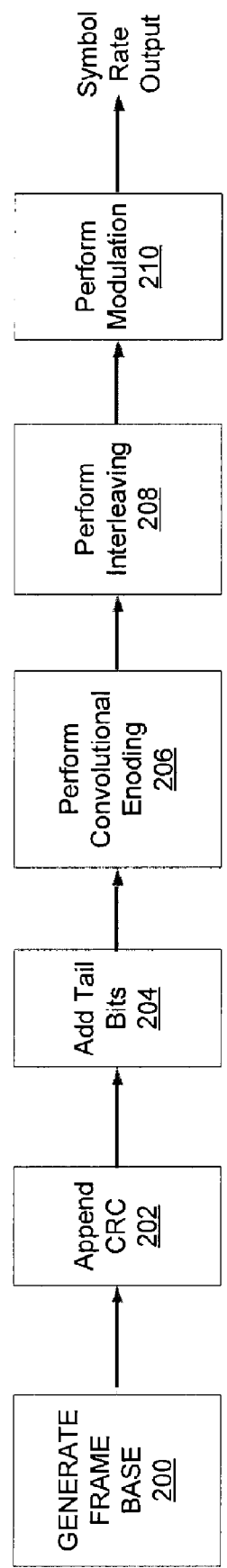
FIG. 2 is a flow diagram illustrating operations performed to construct a frame in accordance with a representative embodiment.

FIG. 2 is a flow diagram illustrating operations performed to construct a data frame in accordance with a representative embodiment. In alternative embodiments, additional, fewer, or different operations may be performed. Further, the use of flow diagrams herein is not meant to be limiting with respect to the order of operations performed. The data frame described with respect to FIG. 2 can be for use in a data channel slot and/or a broadcast channel slot. In an operation 200, a frame base is generated. In a representative embodiment, the frame base can be an 88-bit payload. Alternatively, other numbers of bits may be used. In an operation 202, a cyclic redundancy check (CRC) is appended to the frame base. In a representative embodiment, the CRC can be 32 bits, resulting in a frame of 120 bits. Alternatively, other values may be used. In an operation 204, tail bits are added to the frame. In a representative embodiment, 8 tail bits can be added, resulting in a raw frame of 128 bits. Alternatively, a different number of tail bits may be used. In one embodiment, each of the tail bits can have a value of zero. Alternatively, any or all of the tail bits may have a non-zero value. In an operation 206, the raw frame is convolution encoded. The convolution encoding can be performed at a rate of ½, or any other value depending on the embodiment. In one embodiment, an output of the convolution encoder used to perform the convolution encoding can be 256 bits.

In an operation 208, the bits of the frame are symbol interleaved. In one embodiment, the bits can be interleaved with a strict bit reversed interleaver which utilizes bit reversed addressing. As an example, in a frame buffer containing 256 symbols, the interleaver input addressing can be linear, from 0 thru 255. Each address can be 8 bits. The interleaver can take data at a particular address, and put it in a new position in an output frame buffer. The output address can be a bit reversed ordering of the input address. For example, the symbol at address 15 (00001111b) can be placed in address 240 (11110000b). In an illustrative embodiment, each interleaver input address can be bit reversed to form an output address. In an operation 210, the bits of the frame are modulated. The modulation can be DBPSK modulation. Alternatively, any other type of modulation may be used. The bits can also be spread with a spreading factor based at least in part on the slot size.

Figure 3:
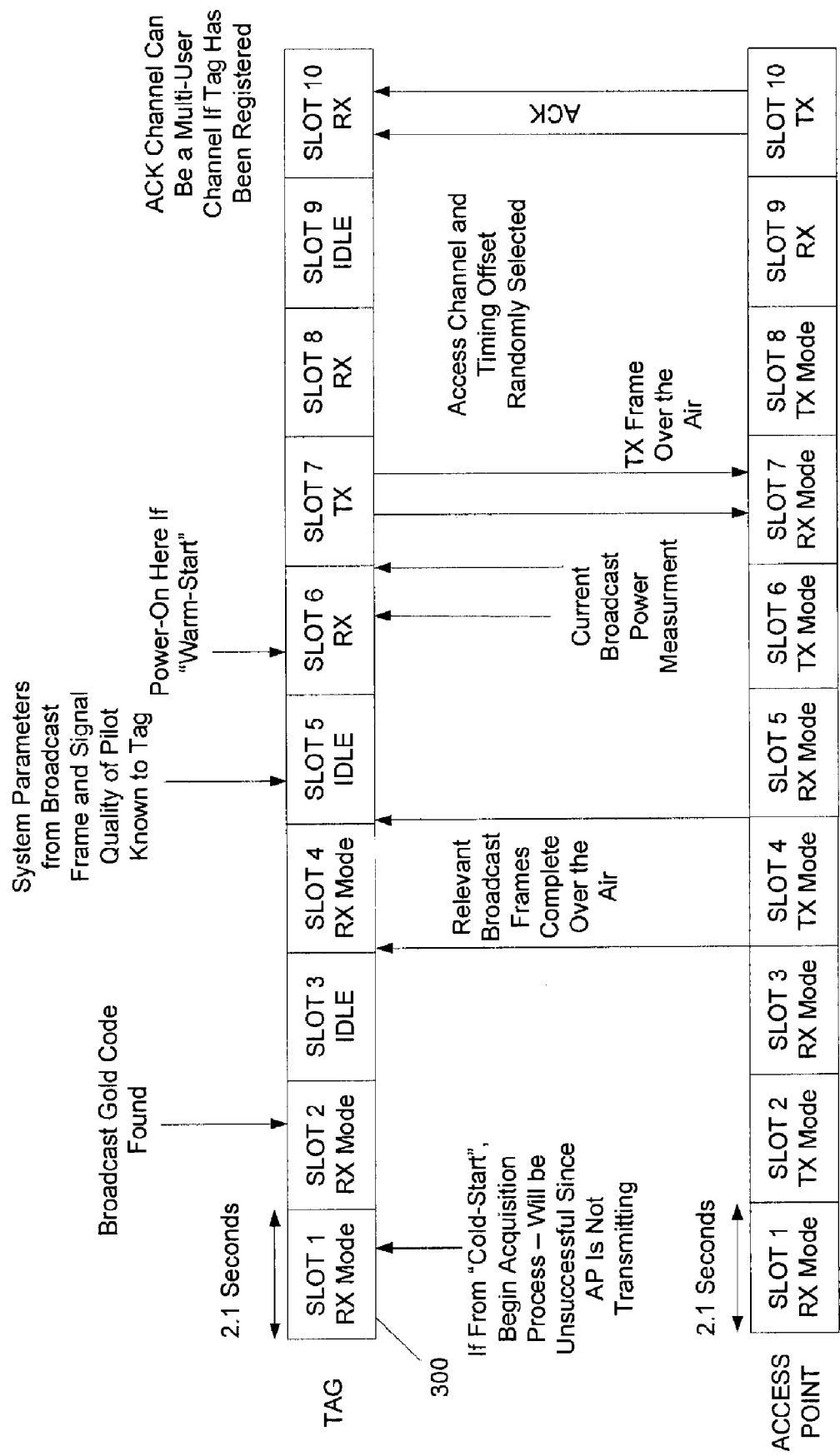
FIG. 3 is a diagram depicting asynchronous initial tag transmit operations in a representative embodiment.

FIG. 3 illustrates asynchronous initial tag transmit operations, including two types of interactions which result in data transfers from the tag to the AP. For purposes of illustration and discussion, slots 300 represent tag slots and slots 302 represent access point slots. "Cold Start" is where the tag is coming into the system without any relevant state information and "warm start" is where the tag is aware of the system information such as slot timing and a reduced range of coarse AFC hypotheses to explore.

In the "Cold Start" scenario, the tag begins seeking access at a slot-asynchronous point in time. FIG. 3 depicts a time where the tag begins attempting to acquire the broadcast channel when the AP is not even transmitting it (slot 1). Eventually, the tag's processing explores the valid coarse AFC hypothesis during a period of time that the AP is transmitting the broadcast frame. FIG. 3 depicts this occurring during slot 2. At this point, the non-coherent energy metric causes a dedicated finger to explore the correct chipx4 timing and coarse AFC hypothesis. The finger with the correct hypothesis continually treats each new symbol as the last symbol of the frame and pushes these hypothesized frames through the receive chain where the CRC check indicates failure. At the end of slot 4, the the same relevant state information that a tag entering at a "warm-start" would have and continues to complete the same processing that a "warm-start" tag would undergo.

A tag enters the interaction depicted in slot 6 ("Warm Start") either by a transition through a "Cold Start" procedure or directly upon tag wake-up if relevant state information is appropriately maintained. At this point, the tag makes a measurement of the received strength of the broadcast frame and uses this information to determine the transmit power and spreading factor at which the tag subsequently transmits in slot 7. The tag transmits its message based on: 1) using the measured received broadcast channel signal strength and selecting the minimum spreading factor that can be used to close the link, which minimizes the tag's on time and is best for minimizing power consumption; 2) using the measured received broadcast channel signal strength and the formerly selected spreading factor, the tag transmits at the optimality condition of reception at the AP which is that all users are received by the AP at very similar values of energy per bit to spectral noise density ratio (Eb/No); 3) for all but the maximum spreading factor, randomly selecting the slot access parameter j; and 4) randomly selecting the chip offset value from 0 to spreading factor −1 such that "collisions" at the AP are minimized and random selection at each transmission allows "collisions" to be resolved in subsequent transmission opportunities.

During slots 8 and 9, the AP processes all the signals received during slot 7 and sends a positive acknowledgement back during slot 10. The AP either aggregates several ACKs into a single channel characterized by a gold code, or sends a dedicated message to the tag using its dedicated gold code channel. Note that the former method requires some registration procedure (not shown) to assign the channel. In either case, the tag updates its chip×4 timing using the preamble of the message.

Figure 4:
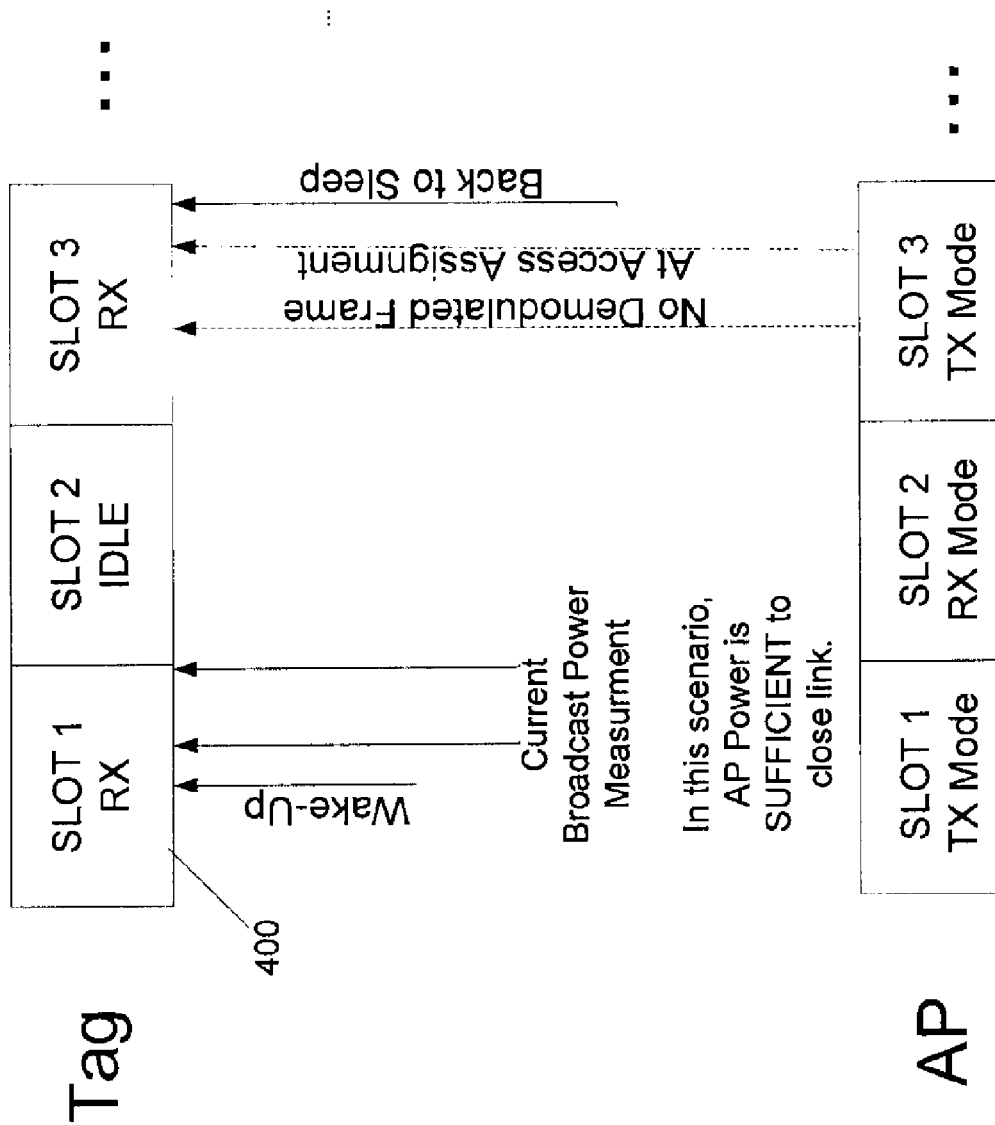
FIG. 4 is a diagram depicting interactions between an access point and a tag in a slotted mode according to a representative embodiment.

FIG. 4 illustrates a simple interaction between an access point and a tag in a slotted mode. In a representative embodiment, the simple interaction involves no data for the tag and a relatively static channel. For purposes of illustration and discussion, timeline 400 represents tag processing during the slots and timeline 402 represents access point processing during slots. The nature of the system is that the tag spends a maximum possible time in a low-power state—a state where system timing is maintained via a low-power, low-frequency crystal oscillator which is typically 32 kHz. To support this, a maximum tolerable latency upon AP initiated interaction is identified (i.e., this is the rate cycling in and out of the low power state for the tag to check if any AP action is pending). FIG. 4 shows the interaction of a tag coming out of it's low power state to check if the AP is wanting to initiate a transaction. This occurs at a slot phase and rate agreed upon between the AP and the tag during registration.

The tag would typically enter a "warm start" where the frame timing and coarse AFC hypothesis are known to within a tight range. The tag makes a measurement of the received broadcast channel power. FIG. 4 shows the scenario where that power has not changed considerably since the last interaction with the AP. This means that the last transmit power/spreading factor that the AP transmitted at is sufficient to close the link. In slot 3, the tag attempts to acquire on the preamble and then demodulate the frame using its dedicated gold code. A typical scenario is the AP not having sent information and the tag immediately goes back to sleep.

Figure 5:
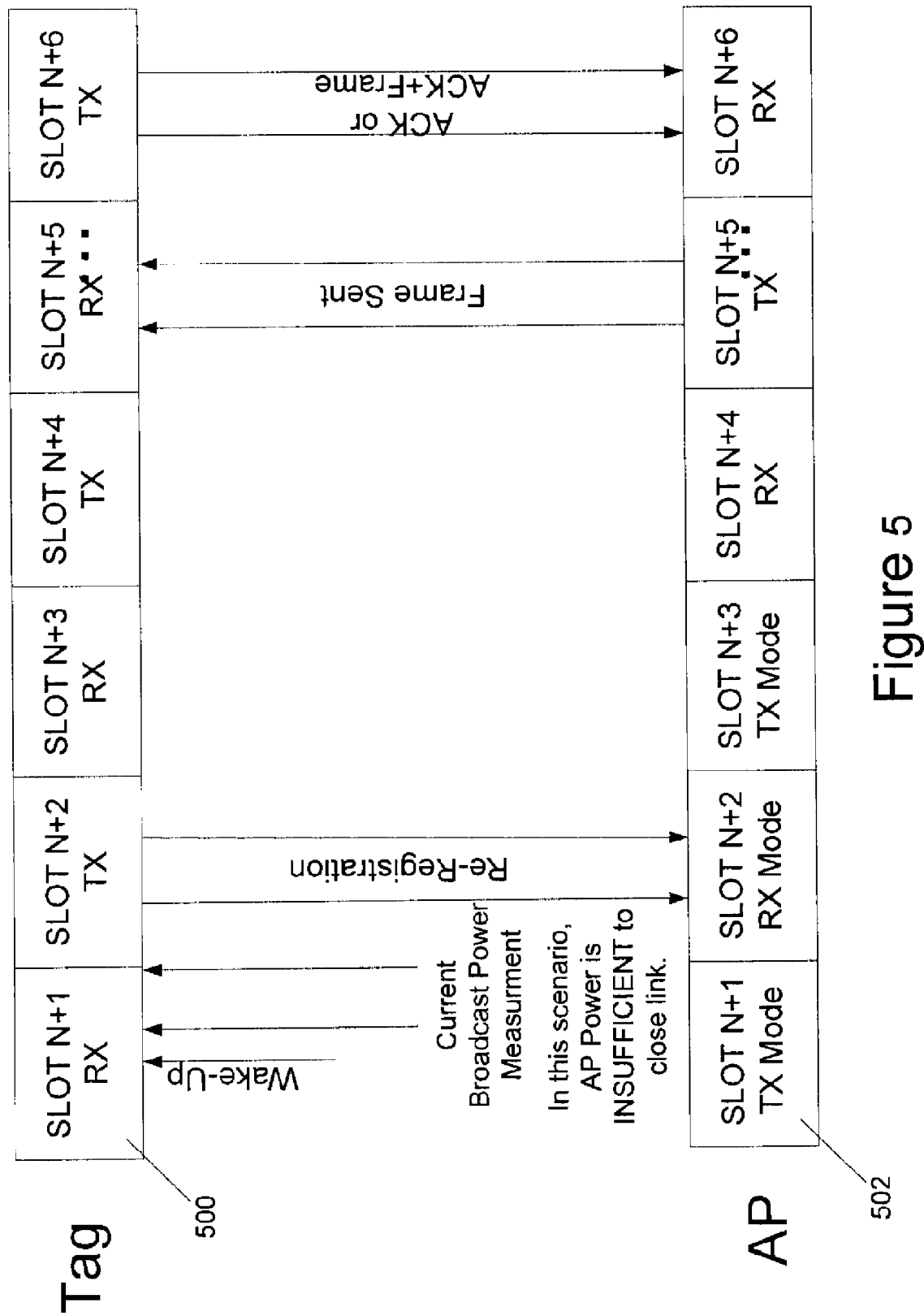
FIG. 5 is a diagram depicting data transfer between an access point and a tag according to a representative embodiment.

FIG. 5 depicts a more complicated interaction which involves data transfer and dynamically changing propagation between an access point and a tag according to a representative embodiment. For purposes of illustration and discussion, timeline 500 represents tag processing during the slots and timeline 502 represents access point (AP) processing during the slots. Here, the AP has information to send and the propagation of the channel has changed considerably since the last AP transaction. The current broadcast channel power measurement has changed such that the tag knows that the subsequent transmission would not be appropriate if it transmits at the same transmit power/spreading factor as last time. Thus, the tag sends a re-registration message using the protocol explained in FIG. 3 to alert the AP to use a new transmit power/spreading factor appropriate to the current channel conditions. The new information governs the transmission and reception of the frame occurring in slot N+5. The tag generates an acknowledgement (ACK) message governed by the protocol of FIG. 3 to indicate a successful transmission. If the ACK is successfully received, the transaction is considered complete. Otherwise, the tag attempts a retransmission.

In one embodiment, the communication interface described herein can be a half duplex time division multiplexed frame format. The access point can transmit for a portion of the time in the downlink direction to the tag, and the tag can transmit for a portion of the time in the uplink direction to the access point. The time allocation between the uplink slot and the downlink slot may be equal (i.e., 50% of the time is allocated to the uplink slot and 50% of the time is allocated to the downlink slot). The frame structure can be centered about a slot structure whose format numerics can be based on a maximum supported uplink spreading factor. In a representative embodiment, the maximum spreading factor at the uplink can be that which allows the tag to successfully transmit to the access point when the tag is under the most challenging transmit conditions based on weather, location, etc.

In general, use of a large spreading factor can allow a given transmitter such as a tag to transmit with less power while still being able to be received by a given receiver such as an access point. However, use of a large spreading factor can also increase the time that it takes to transmit a signal. In a representative embodiment, the tag may broadcast at a lower power than that used by the access point. As such, the spreading factor of the uplink signal can be selected as large enough such that the signal transmitted by the tag can be received by the access point even when the tag is physically located in a challenging location and/or under challenging transmission conditions. In the representative embodiment, the access point may transmit with more power than the tag may use to transmit. As a result, if the uplink (i.e., tag to access point) transmissions and downlink (i.e., access point to tag) transmissions are given equal amounts of time on the band in which to transmit, the access point can use a smaller spreading factor than the tag. Since the access point signals are not as widely spread, the access point can transmit in a plurality of fundamental downlink slots in the same amount of time as the tag transmits in a single slot. In one embodiment, the access point can transmit at a constant power at or near the maximum RF transmit power available. If the link between the access point and a given tag is robust, a reduced spreading factor can be used for that tag. Robustness of the link can be determined based on a comparison of the link to a predetermined quality threshold. Because the lower spreading factor takes less total time to transmit, the tag can open its receive widow for a relatively short period of time, thereby minimizing power consumption of the tag.

Figure 6:
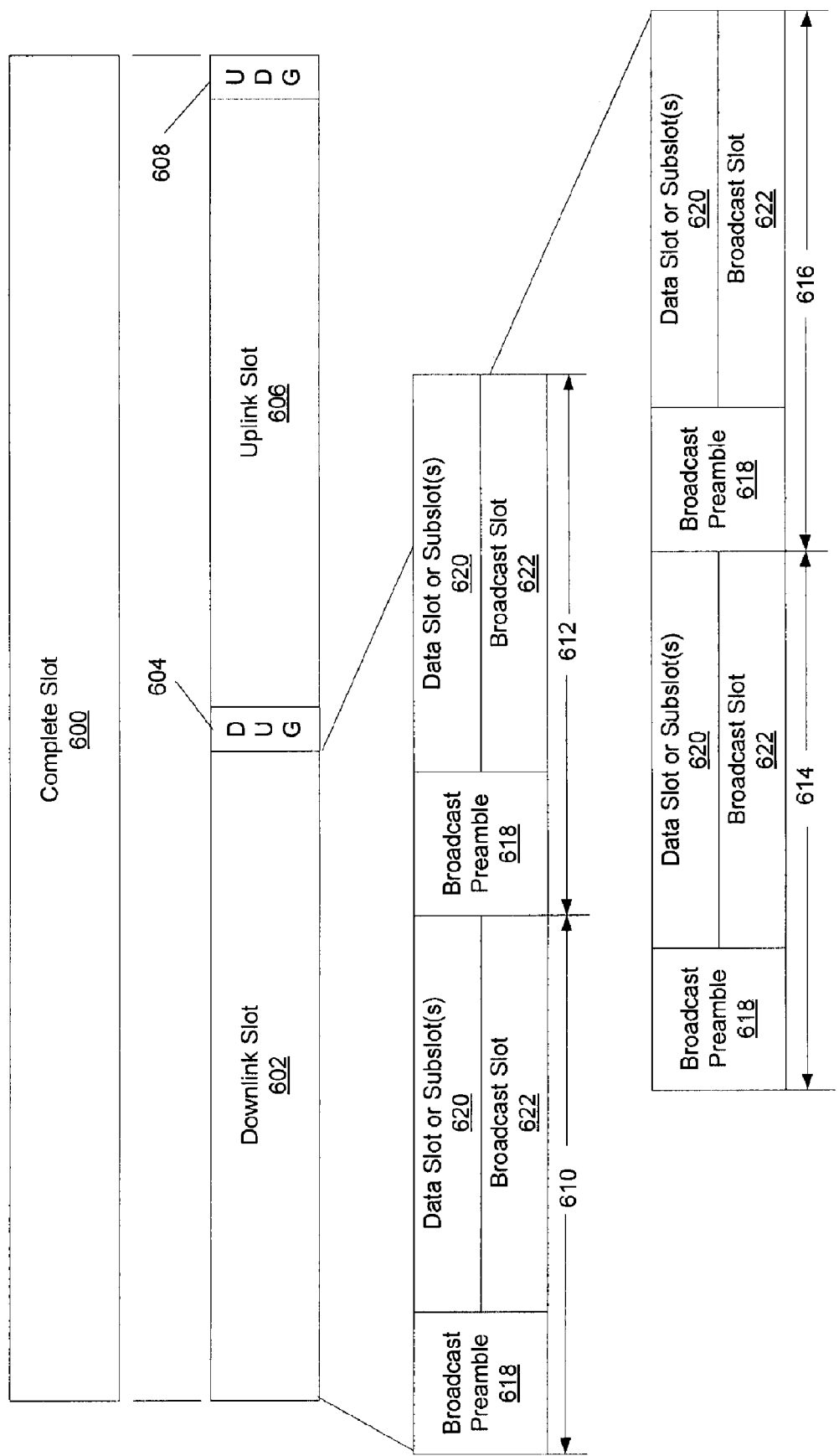
FIG. 6 is a diagram illustrating a complete slot in accordance with a first representative embodiment.

FIG. 6 is a diagram illustrating a complete slot 600 in accordance with a first representative embodiment. In the embodiment of FIG. 6, the access point can transmit with more power and use a smaller spreading factor as compared to the tag. For example, the access point may use a spreading factor of 2048 and the tag may use a spreading factor of 8192. Alternatively, other values may be used. Complete slot 600 includes a downlink slot 602, a downlink to uplink gap (DUG) 604, an uplink slot 606, and an uplink to downlink gap (UDG) 608. In a representative embodiment, downlink to uplink gap 604 may be 15 symbols at the maximum uplink spreading factor (which may be 8192 in one embodiment). Alternatively, any other length downlink to uplink gap may be used. Downlink to uplink gap 604 can be used to ensure a downlink to uplink ratio of 50%. Downlink to uplink gap 604 can also be used to provide tag receiver to transmitter turn-around processing time. In another representative embodiment, uplink to downlink gap 608 may be 1 symbol at the maximum uplink spreading factor. Alternatively, any other length uplink to downlink gap may be used. Uplink to downlink gap 608 can be used to support random phase multiple access (RPMA) for a given spreading factor. As such, a smaller uplink to downlink gap can be used with smaller spreading factors.

Because the access point may use a smaller spreading factor than the tag, the downlink slot can include a plurality of fundamental downlink slots. Downlink slot 602 includes a fundamental downlink slot 610, a fundamental downlink slot 612, a fundamental downlink slot 614, and a fundamental downlink slot 616. Each of the fundamental downlink slots includes a broadcast preamble 618, a data slot or subslot(s) 620, and a broadcast slot 622. In a representative embodiment, broadcast preamble 618 can be 16 symbols. Alternatively, any other length may be used.

Figure 7:
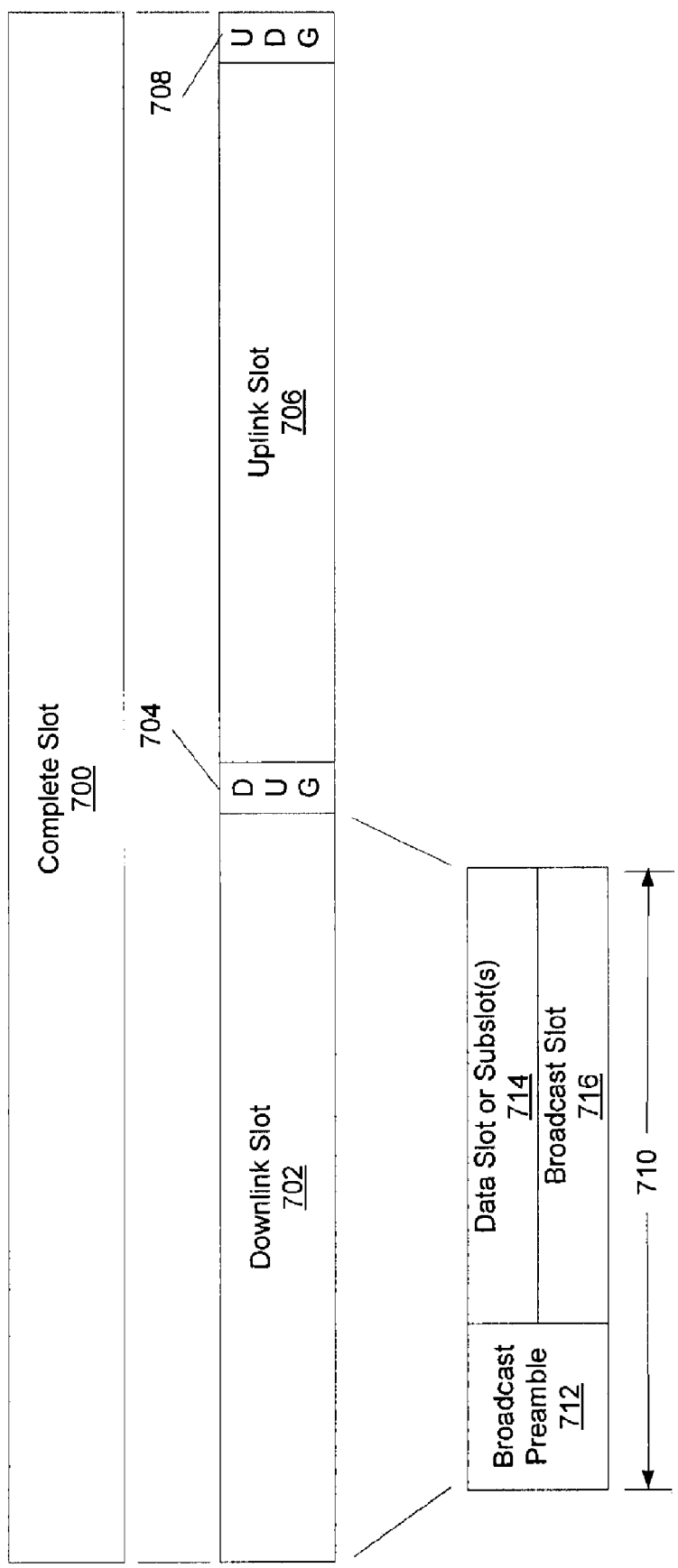
FIG. 7 is a diagram illustrating a complete slot in accordance with a second representative embodiment.

FIG. 7 is a diagram illustrating a complete slot 700 in accordance with a second representative embodiment. In the embodiment of FIG. 7, the access point can transmit with the same power as used by the tag. As such, the same spreading factor may also be used by the access point and the tag. For example, the access point and the tag may both use a maximum spreading factor of 8192. Alternatively, other values may be used. Complete slot 700 includes a downlink slot 702, a downlink to uplink gap 704, an uplink slot 706, and an uplink to downlink gap 708. In a representative embodiment, downlink to uplink gap 704 may be 15 symbols×8192 chips. Alternatively, any other length downlink to uplink gap may be used. In another representative embodiment, uplink to downlink gap 708 may be 1 symbol×8192 chips. Alternatively, any other length uplink to downlink gap may be used. Because the access point uses the same spreading factor as the tag, downlink slot 702 includes a single fundamental downlink slot 710. Fundamental downlink slot 710 includes a broadcast preamble 712, a data slot or subslot(s) 714, and a broadcast slot 716.

Figure 8:
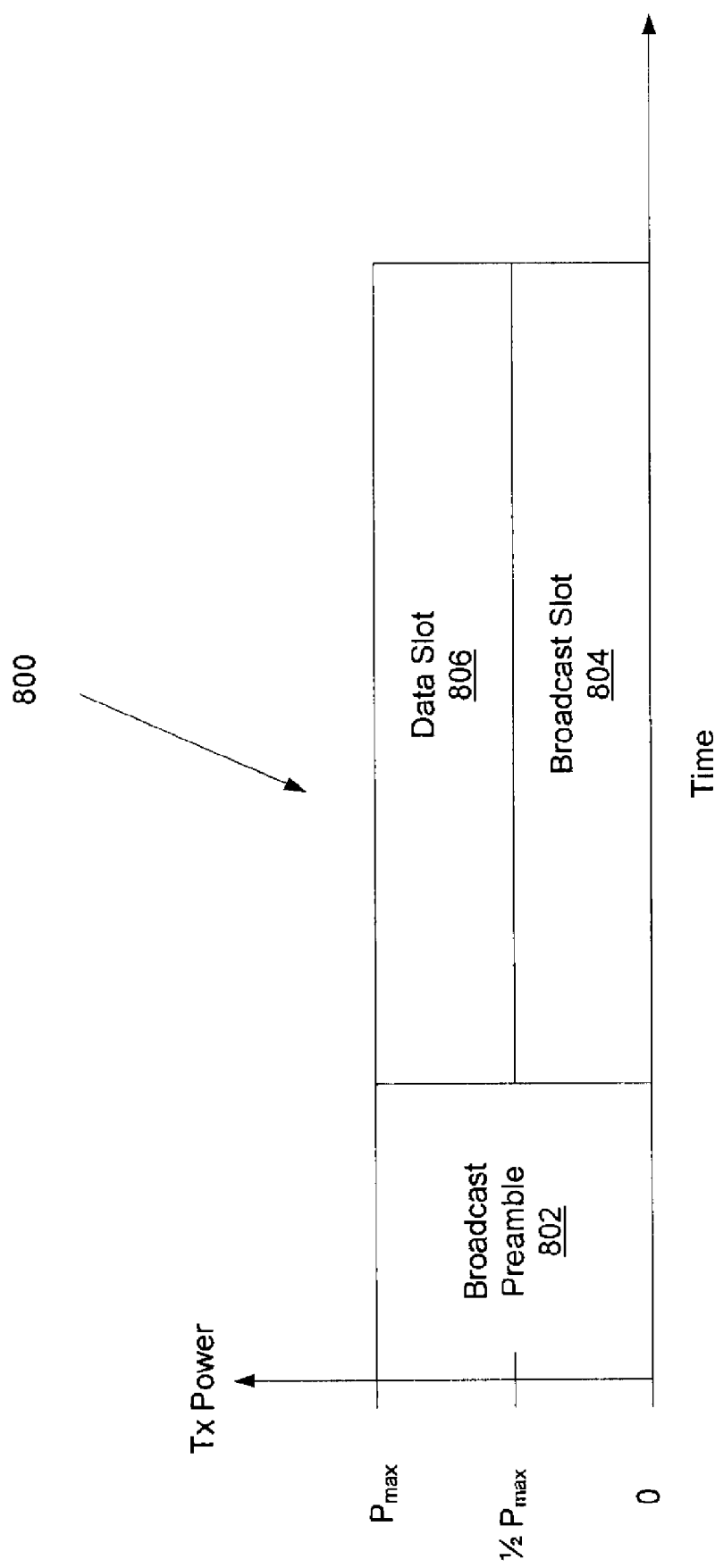
FIG. 8 is a diagram depicting a fundamental downlink slot in accordance with a representative embodiment.

FIG. 8 illustrates a fundamental downlink slot 800 in accordance with a representative embodiment. Fundamental downlink slot 800 includes a broadcast preamble 802, a broadcast channel slot 804, and a data channel slot 806. Broadcast preamble 802 can be 16 symbols long, or any other length depending on the embodiment. In a representative embodiment, broadcast channel slot 804 can include a single broadcast channel frame. In one embodiment, the broadcast channel frame can be identical in creation to a data channel frame with the exception that the broadcast channel gold code generator may reset every symbol whereas the data channel gold code generator may run until the end of the data channel frame before resetting.

In a representative embodiment, broadcast preamble 802 can be boosted relative to other transmissions made using broadcast channel slot 804 or data slot 806. As an example, broadcast preamble 802 can be transmitted at a maximum power ($P_{max}$), and other transmissions can be made at one half of the maximum power (½ $P_{max}$). In one embodiment, broadcast preamble 802 can be boosted by 3 decibels (dB) relative to other transmissions via broadcast channel slot 804 and/or data slot 806. Alternatively, broadcast preamble 802 may be boosted by any other amount. The boosted preamble allows receivers at the tags to robustly estimate chip timing and AFC/time tracking with reference to the access point. The payload of broadcast preamble 802 can be programmable. In one embodiment, no channel coding, interleaving, or cyclic redundancy check (CRC) may be applied to the payload of broadcast preamble 802.

Figure 9:
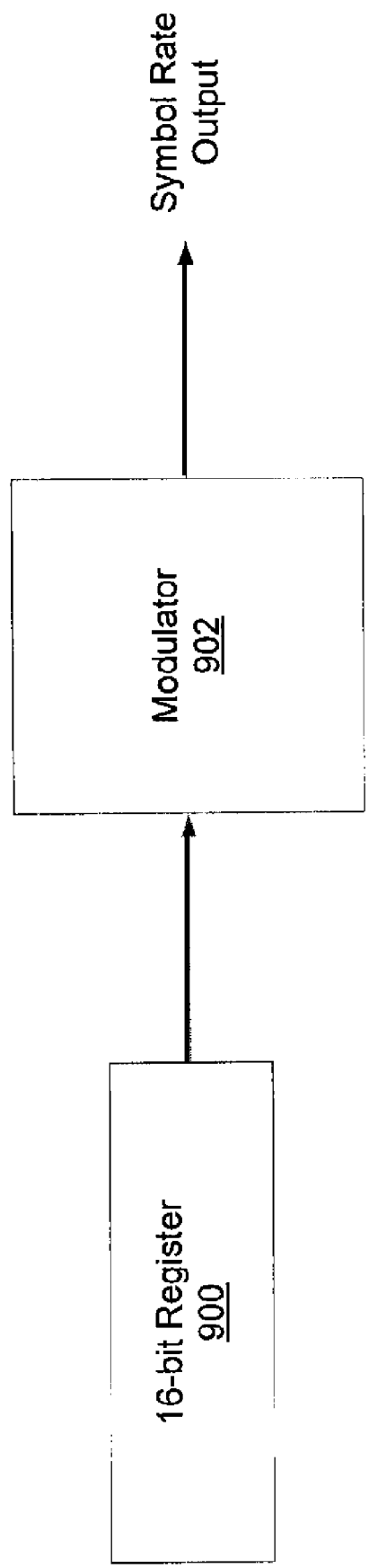
FIG. 9 is a diagram illustrating preamble frame processing in accordance with a representative embodiment.

FIG. 9 is a diagram illustrating preamble frame processing in accordance with a representative embodiment. A 16-bit register 900 can provide symbols to a modulator 902 for modulation. Alternatively, any other length register may be used. Those symbols can consist of the individual bits of the broadcast preamble 802 of FIG. 8. Modulator 902 can output modulated symbols at a symbol rate. Modulator 902 can be a differential binary phase shift keying (DBPSK) modulator, or any other type of modulator known to those of skill in the art. As a result, each symbol of broadcast preamble 802 can be modulated, spread with the maximum downlink spreading factor, and boosted for transmission. In a representative embodiment, broadcast preamble 802 may be boosted by ensuring that no other data is transmitted during transmission of broadcast preamble 802. For example, broadcast preamble 802 may be broadcast at $P_{max}$ through broadcast channel slot 804 and data channel slot 806 may be turned off while broadcast preamble 802 is being broadcast. In one embodiment, broadcast preamble 802 can be transmitted on one of an I channel or a Q channel. Broadcast preamble 802 can be multiplied by a scale factor of 1 such that broadcast preamble 802 is transmitted at full power. When broadcast preamble 802 is not being broadcast, an attenuating scale factor can be used such that data is transmitted at less than full power. In one embodiment, the attenuating scale factor can be $1/\sqrt{2}$, resulting in a 3 dB attenuation. In an alternative embodiment, the scale factor may not altered. In such an embodiment, broadcast preamble 802 can be transmitted on both the I channel and the Q channel such that broadcast preamble 802 is transmitted at full power.

Referring again to FIG. 8, data channel slot 806 may contain a single data channel frame. Alternatively, data channel slot 806 may contain a plurality of data channel frames in a single fundamental downlink slot such as fundamental downlink slot 800. As a result, data channel slot 806 of fundamental downlink slot 800 can include a plurality of sub-slots corresponding to the plurality of data channel frames (i.e., one sub-slot for each frame). In a representative embodiment, the spreading factor of data channel slot 806 can be the same as the spreading factor of broadcast channel slot 804. In another representative embodiment, the spreading factor of data channel sub-slots can be less than the spreading factor of broadcast channel slot 804.

Figure 10:
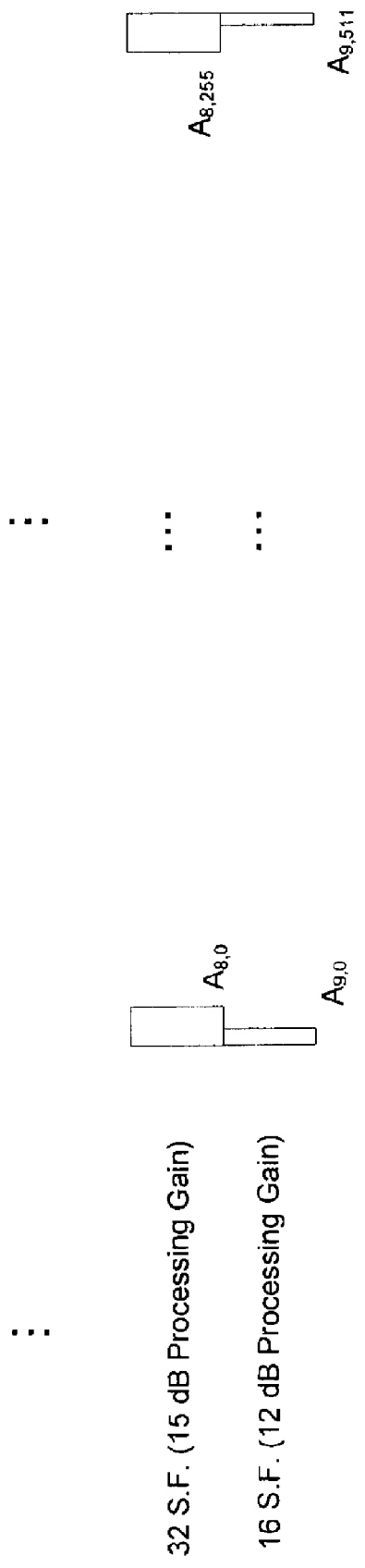
FIG. 10 is a diagram illustrating a data sub-slot hierarchy in accordance with a representative embodiment.

In one embodiment, multiple data channel sub-slots can be created by using smaller spreading factors than those used with either a full size (i.e., single) data channel slot or with the broadcast channel slot. FIG. 10 is a diagram illustrating a data sub-slot hierarchy in accordance with a representative embodiment. As illustrated in FIG. 10, if a spreading factor of 8192 and a 39 dB gain are used, the data channel includes a single data channel slot $A_{0,0}$. If a spreading factor of 4096 and a 36 dB gain are used, the data channel slot includes two sub-slots $A_{1,0}$ and $A_{1,1}$. Similarly, if a spreading factor of 16 and a 12 dB gain are used, the data channel slot includes 512 sub-slots $A_{9,0} \ldots A_{9,511}$, and so on.

Figure 11A:
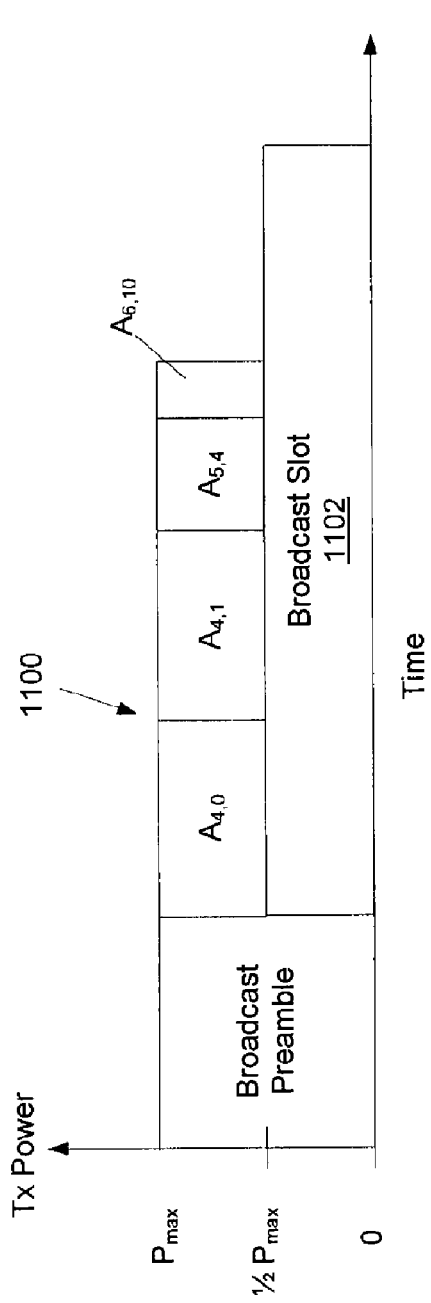
FIG. 11A is a diagram depicting a fundamental downlink slot with a plurality of sub-slots in accordance with a representative embodiment.
Figure 11B:
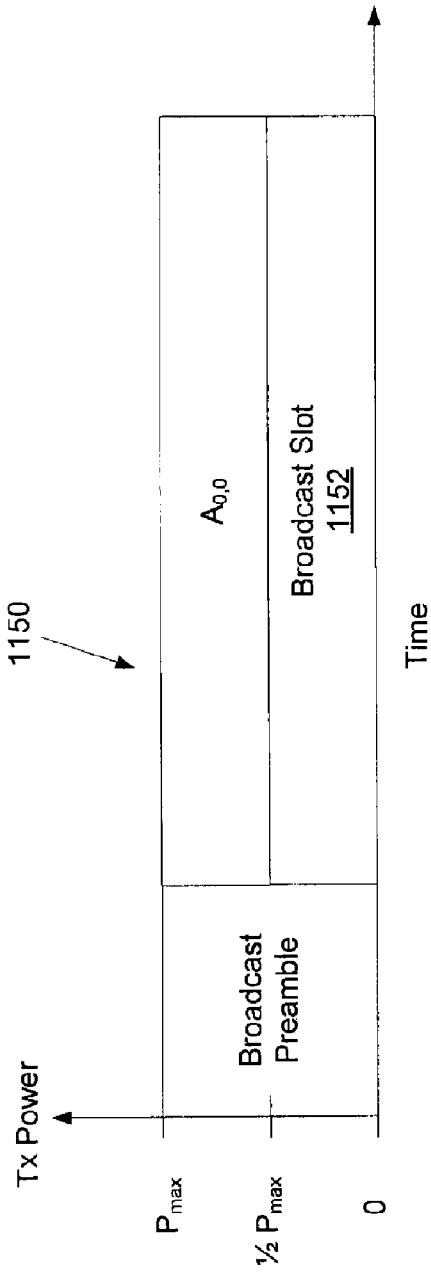
FIG. 11B is a diagram depicting a fundamental downlink slot with a single slot in accordance with a representative embodiment.

FIG. 11A illustrates a fundamental downlink slot 1100 with a plurality of sub-slots in accordance with a representative embodiment. As illustrated in FIG. 11A, sub-slots of different sizes can be combined to form the data channel slot. The plurality of sub-slots includes a sub-slot $A_{4,0}$, a sub-slot $A_{4,1}$, a sub-slot $A_{5,4}$, and a sub-slot $A_{6,10}$. In alternative embodiments, other combinations of sub-slots may be used. A broadcast channel slot 1102 of fundamental downlink slot 1100 can have a spreading factor of 2048. Alternatively, other values may be used. A tag or other receiving device can turn on its receiver to listen to one or more of these sub-slots as appropriate. FIG. 11B illustrates a fundamental downlink slot 1150 with a single slot $A_{0,0}$ in accordance with a representative embodiment. A broadcast channel slot 1152 of fundamental downlink slot 1150 can have a spreading factor of 8192. Alternatively, other values may be used.

Figure 12:
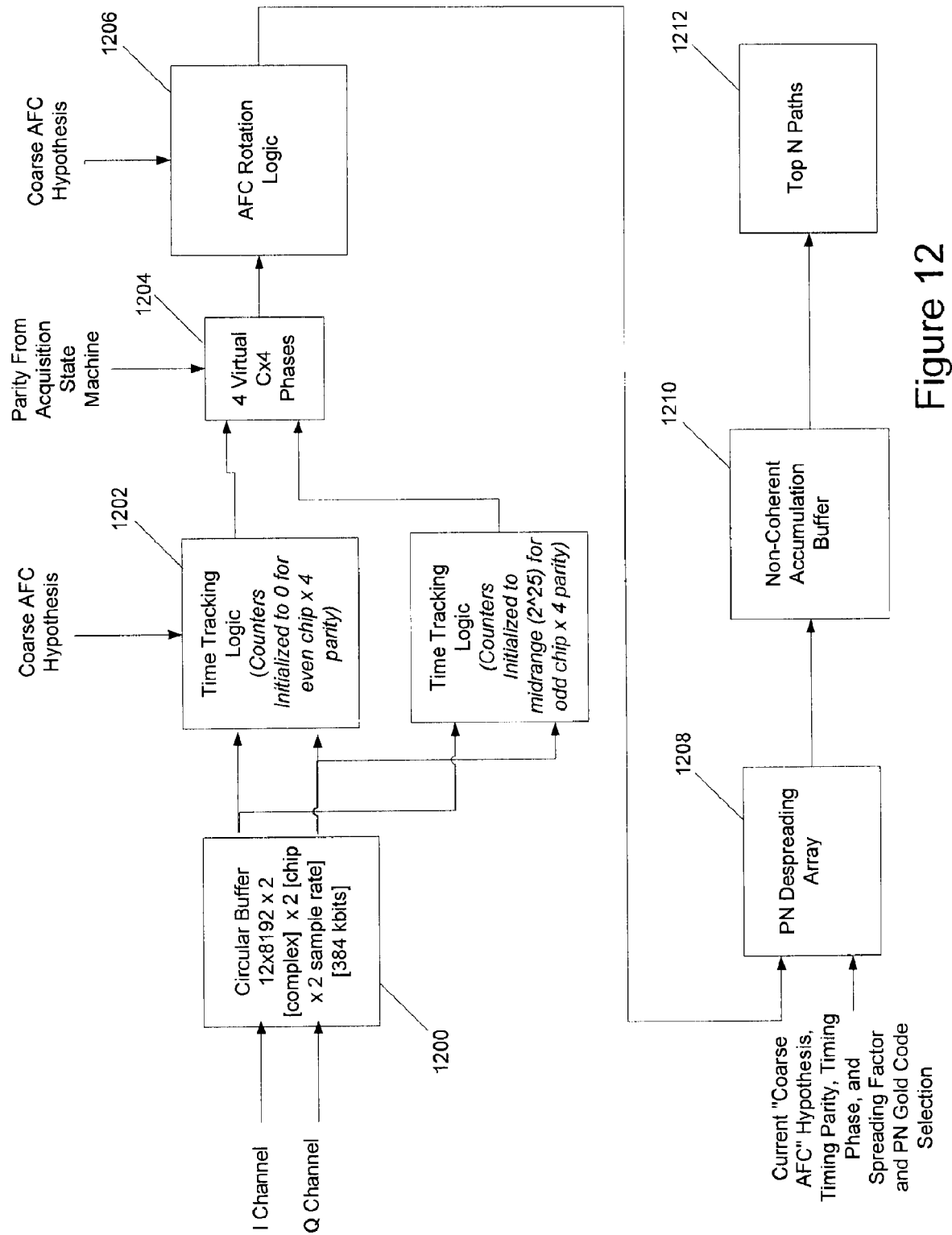
FIG. 12 is a diagram illustrating a system for signal acquisition and rectangle search.

FIG. 12 illustrates a tag receive data path depicting the tag's timing acquisition processing in accordance with a representative embodiment. As shown, the one-bit complex samples are buffered in a circular buffer 1200 such that enough data is present to make reliable detection of valid energy. Representative values are provided in the circular buffer block 1200. For example, one embodiment buffers 12 symbols. In alternative embodiments other values may be used. The samples may be input from the I channel and Q channel into this circular buffer scheme at the synchronous sample rate of chip×2 or 2 MHz. Alternatively, other rates may be used. At the fast asynchronous clock, these samples are used to explore the various coarse AFC hypotheses. Based on the current coarse AFC hypothesis, time-tracking is performed at chip×4 resolution in time tracking logic 1202. Since the same timing reference is used to drive both the carrier frequency and the sample clocks on both the AP and the tag, a coarse AFC hypothesis with a known carrier frequency can uniquely map to a known rate of time tracking.

In FIG. 12, circular buffer 1200 receives communication signals over the I channel and the Q channel. These signals are sent to time tracking logic 1202. The time tracking logic 1202 also receives a coarse AFC hypothesis and the logic 1202 may reset to zero at even chip×4 parity. The time tracking logic 1202 can have two blocks, one with counters initialized to zero for even chip×4 parity, and one with counters initialized to midrange (i.e., 2^25) for odd chip×4 parity. The output of time tracking logic 1202 is provided to a block 1204 in which virtual chip×4 phases are applied. Block 1204 also can receive parity from an acquisition state machine. Automatic frequency control (AFC) rotation logic 1206 is applied to an output of block 1204. The AFC Rotation logic 1206 output is passed to the PN Despreading Array 1208 described herein. The results from the PN despreading array are used by the non-coherent accumulation buffer 1210 to select the top N paths 1212. The number of paths selected depends on a number of factors include space available for demodulation.

Figure 13:
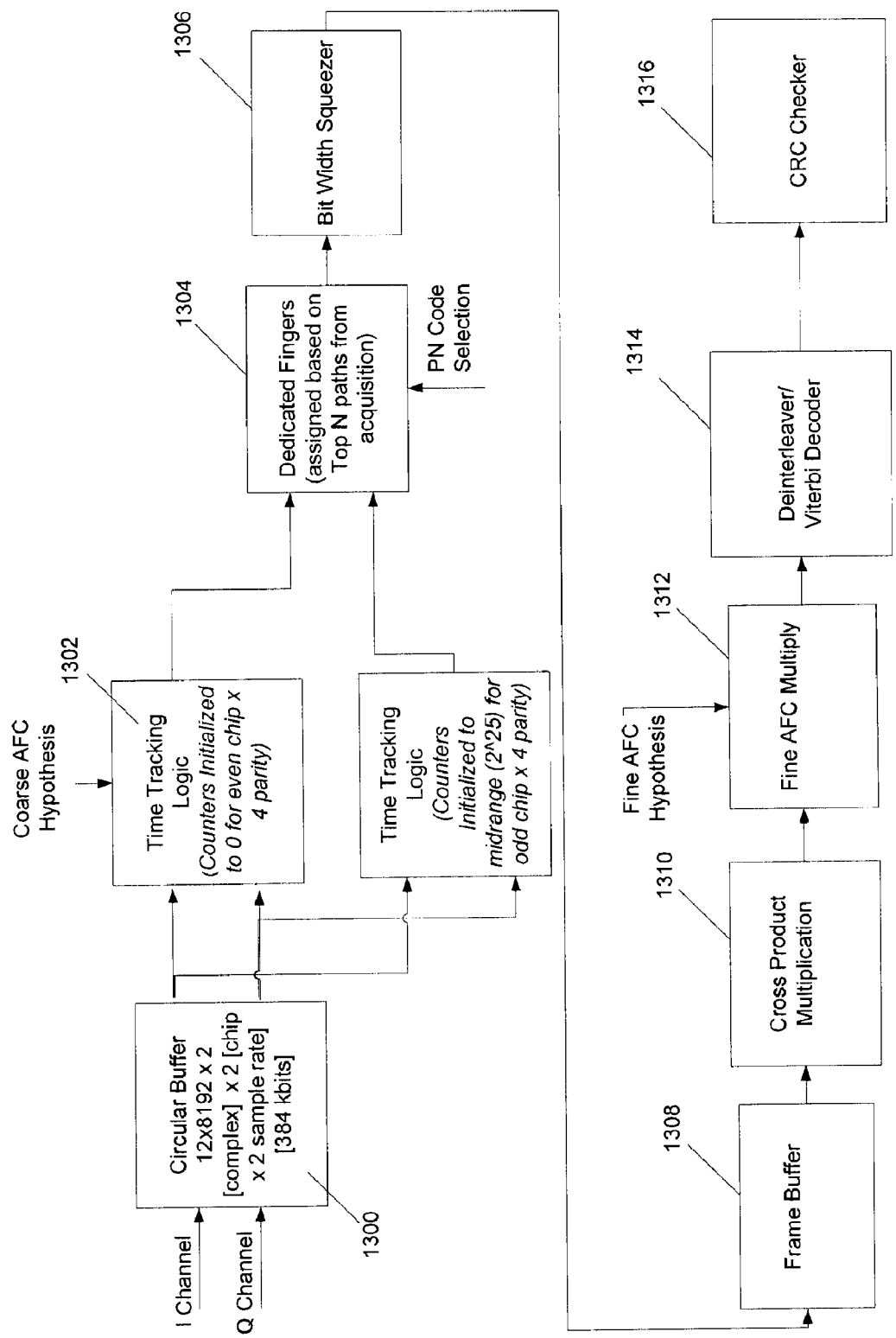
FIG. 13 is a diagram illustrating a system for frame demodulation.

FIG. 13 further illustrates a tag receive path including receive demodulation. In FIG. 13, the circular buffer 1300 receives communication signals over the I channel and the Q channel. These signals are sent to time tracking logic 1302 and on to dedicated fingers 1304. The time tracking logic 1302 also receives a coarse AFC hypothesis and the logic 1302 may reset to zero at even chip×4 parity. The time tracking logic 1302 can have two blocks, one with counters initialized to zero for even chip×4 parity, and one with counters initialized to midrange (i.e., 2^25) for odd chip×4 parity. The output of time tracking logic 1302 is provided to dedicated fingers 1304 which have been assigned during acquisition as previously described. The dedicated fingers 1304 also receive a PN code selection. The output of the dedicated fingers 1304 is passed to a bit width squeezer 1306. The bit width squeezer 1306 output is passed to a frame buffer 1308. The frame buffer 1308 data is demodulated by the cross product multiplication block 1310. The output of the cross product multiplication block 1310 is passed to the fine AFC multiply 1312, which also takes a fine AFC hypothesis as input. The data is then passed to a deinterleaver 1314, which may comprise a Viterbi decoder, and finally to a CRC checker 1316. This process is explained further herein.

Figure 14:
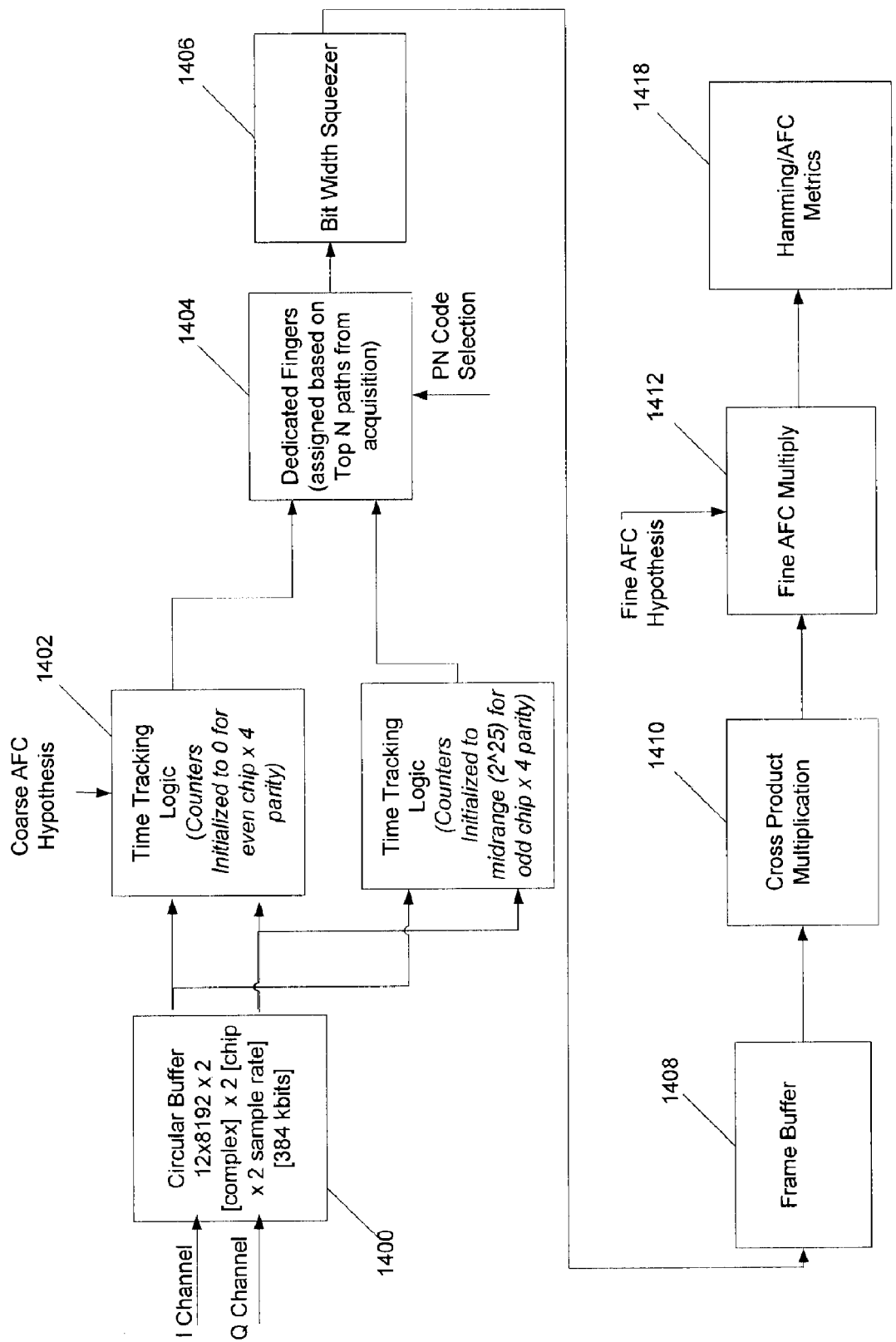
FIG. 14 is a diagram illustrating a system for preamble processing.

FIG. 14 further illustrates a tag receive path including preamble processing which is done on a boosted preamble while the circular sample buffer is frozen. This figure is identical to FIG. 13 up to the Fine AFC Multiply block 1412. In FIG. 14, the circular buffer 1400 receives communication signals over the I channel and the Q channel. These signals are sent to time tracking logic 1402 and on to dedicated fingers 1404. The time tracking logic 1402 also receives a coarse AFC hypothesis and the logic 1402 may reset to zero at even chip×4 parity. The time tracking logic 1402 can have two blocks, one with counters initialized to zero for even chip×4 parity, and one with counters initialized to midrange (i.e., 2^25) for odd chip×4 parity. The output of time tracking logic 1402 is provided to dedicated fingers 1404 which have been assigned during acquisition as previously described. The dedicated fingers 1404 also receive a PN code selection. The output of the dedicated fingers 1404 is passed to a bit width squeezer 1406. The bit width squeezer 1406 output is passed to a frame buffer 1408. The frame buffer 1408 data is demodulated by the cross product multiplication block 1410. The output of the cross product multiplication block 1410 is passed to the fine AFC multiply 1412, which also takes a fine AFC hypothesis as input. The hamming and AFC metrics block 1418 produces results that can be used to determine timing for receive operations and a frequency offset, a spreading factor selection, and a modulation type (DBPSK or 2-ary modulation) for transmit operations. This process is explained further herein.

Figure 15:
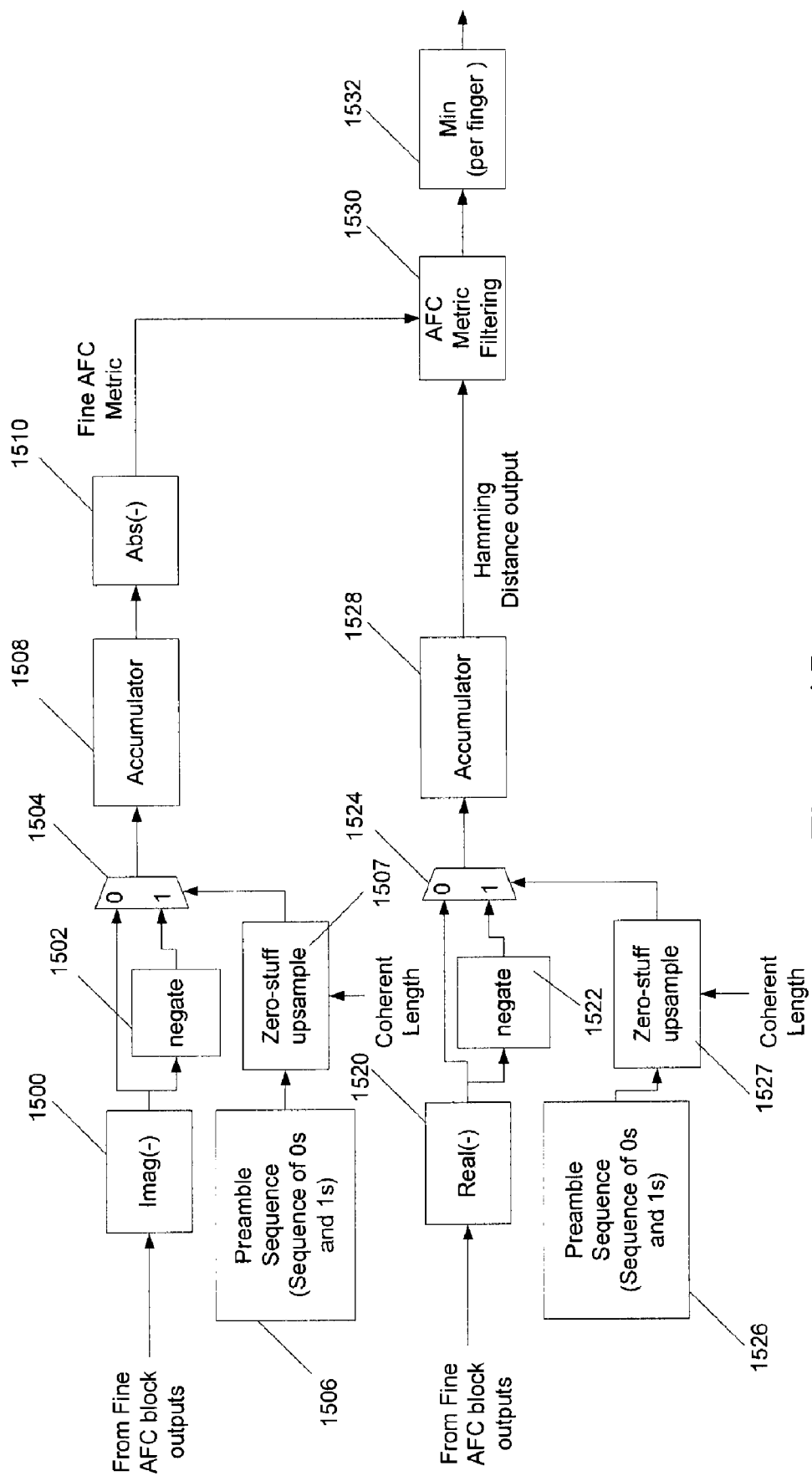
FIG. 15 is a diagram illustrating a system for developing a timing for receive operations and a frequency offset for transmit operations

In FIG. 15, a system for developing a timing for receive operations and a frequency offset, a spreading factor selection, and a modulation type (DBPSK or 2-ary modulation) for transmit operation is illustrated. The logic may operate on a boosted preamble and may use the same samples over and over throughout acquisition. The inputs from the fine AFC rotator include different fine AFC hypotheses for each of the dedicated fingers. The imaginary component from the Fine AFC multiply block is selected in block 1500 and negated in block 1502. Block 1504 selects between the positive and negative versions based on the preamble sequence 1506 which is zero-stuffed upsampled in block 1507. Accumulator 1508 sums the total and the absolute value is taken in 1510. Similarly, the real component from the Fine AFC multiply block is selected in block 1520 and negated in block 1522. Block 1524 selects between the positive and negative versions based on the preamble sequence 1526 which is zero-stuffed upsampled in block 1527. Accumulator 1528 sums the total. After each AFC hypothesis is tested, accumulator 1508 and accumulator 1528 are reset.

When the fine AFC is such that there is little AFC drift, the optimal coherent integration length is chosen, and the finger has been properly aligned via acquisition, the real portion of the fine AFC output resembles the preamble sequence. This is because the modulation used is BPSK which exists on the in-phase arm of the constellation. Thus, for instance, if the sign of the real of the fine AFC output is ++−+, then the corresponding preamble sequence is 0010 resulting in a high accumulated value at accumulator 1528. In another example, in block 1507 and block 1527, when the coherent integration length is less than the base spreading factor of the broadcast channel, the preamble sequence is zero-stuffed upsampled such that 0010 would become 00001000 if the coherent length was cut in half. If the coherent length was equal to the symbol duration, operation 1507 and operation 1527 would do nothing to the preamble sequence. The corresponding imaginary component of the fine AFC output should be random compared to the preamble sequence when the fine AFC is the proper value, the optimal coherent integration length is chosen, and the finger has been properly aligned via acquisition. This is because there is no signal modulation on the quadrature arm of the constellation only noise which averages to zero. Thus, the accumulated value at accumulator 1508 is a small value in the absolute sense.

AFC metric filtering block 1530 passes on those AFC Metrics which have hamming metrics that exceed some threshold as well as exceed some multiple of the AFC Metrics. Finally, block 1532 gates those AFC metrics based on a minimum valid AFC metric on a per finger basis. Block 1532 also keeps track of the winning fine AFC index and hamming distance at the minimum. In alternative embodiments, it is possible for only the hamming distance to be used to determine the optimal fine AFC, timing and coherent integration length. The winning fine AFC index, along with the coarse AFC, coherent integration length, and timing information of the fingers, can be used to determine timing and coherent integration length for receive operations, as well as a frequency offset, a spreading factor selection and a modulation type (DBPSK or 2-ary) for transmit operations. This process is described further herein.

Figure 16:
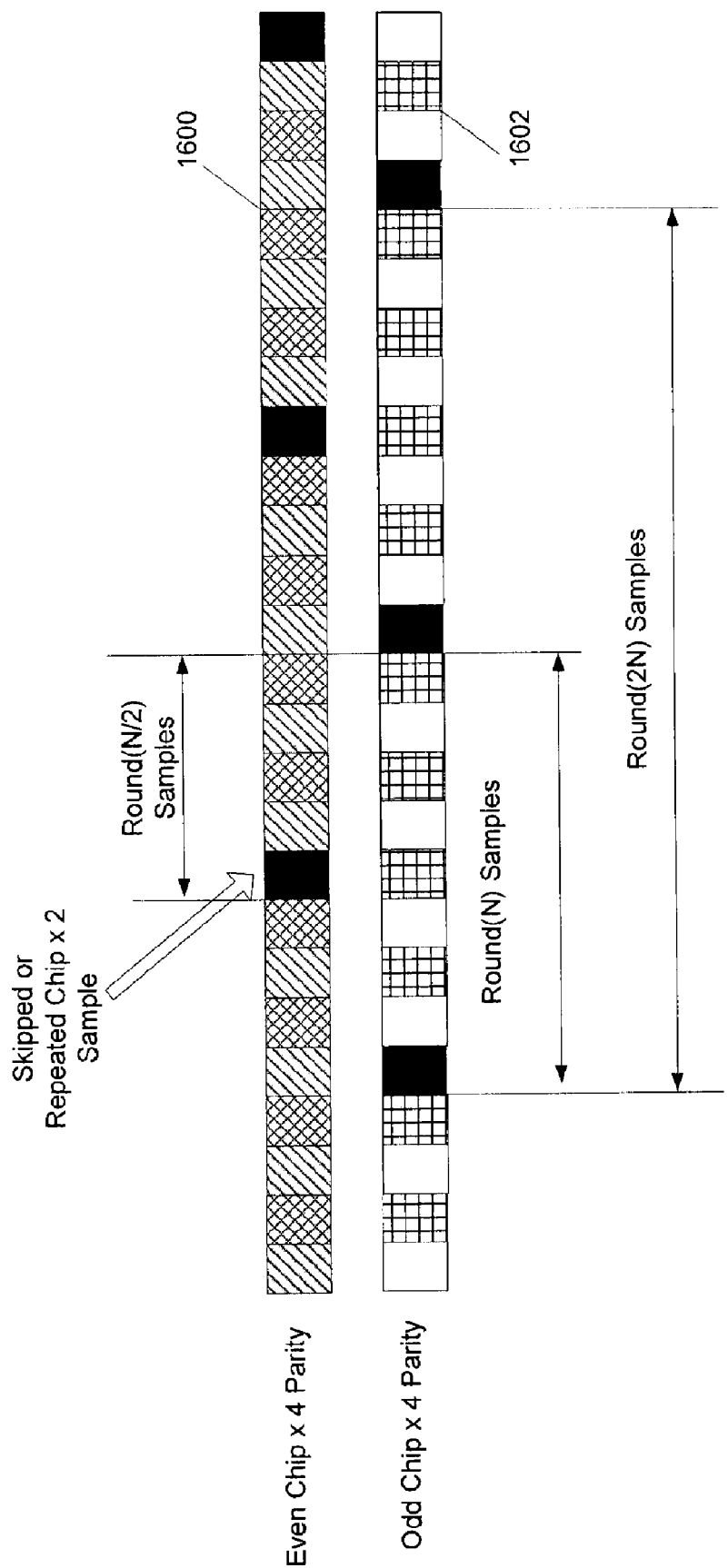
FIG. 16 is a diagram depicting time tracking in a representative embodiment.

FIG. 16 illustrates a representative embodiment of the two blocks of time tracking logic 1202 described with reference to FIG. 12. Stream 1600 is a communication stream with an even chip×4 parity. Stream 1602 is a communication stream with an odd chip×4 parity. FIG. 16 depicts the time-tracking operation where each different shading represents a different chip×4 spaced sequence. Samples are either inserted or repeated at a rate directly depending on which current AFC hypothesis is being explored, multiplied by a known ratio between the sample rate and the carrier frequency. This can be used as a locked clock assumption to collapse a 2-dimensional space down to a single dimension. The value N depicted has a fractional component which is book-kept to allow for sufficient time-tracking precision. A particular parity of the 4 possible chip×4 phases is selected at a given time. The resultant chip rate sequence is then derotated in a 1-bit data path as shown in FIG. 17.

Figure 17:
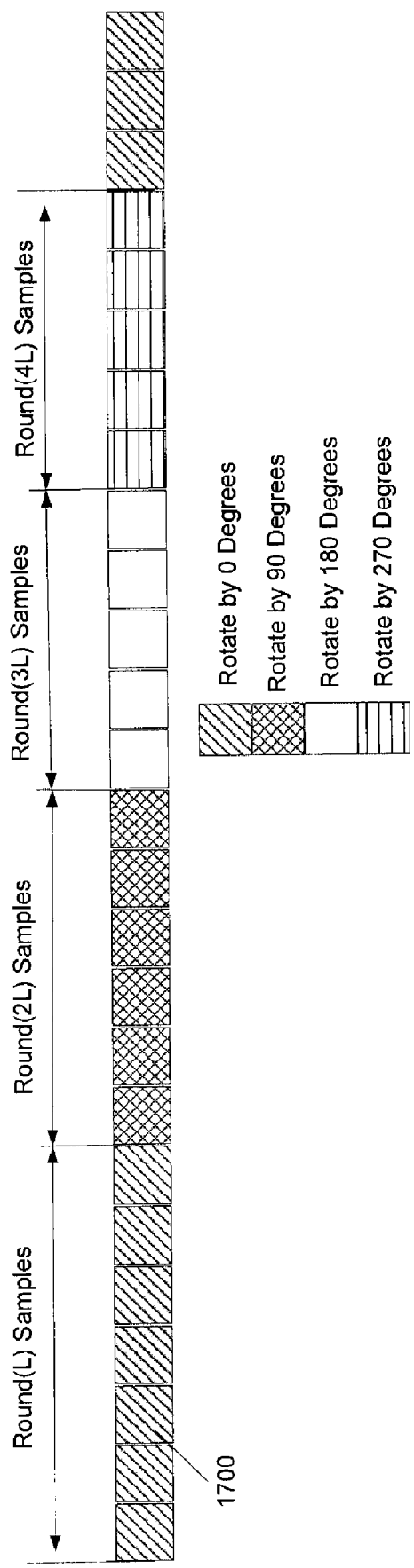
FIG. 17 is a diagram depicting an AFC (automatic frequency control) rotation in a representative embodiment.

FIG. 17 depicts the functionality of the AFC (automatic frequency control) rotation logic 1206 of FIG. 12 which operates on one of the 4 virtual chip×4 phases 1700 at a given time. FIG. 17 depicts a one-bit derotation mechanism. This derotation mechanism is designed to undo the AFC rotation due to the relative carrier drift between the receiver and transmitter for the postulated coarse AFC hypothesis. Since it is a one-bit transform (represented by Table 1), the 90 degree resolution of the process is +/−45 degrees relative to the continuum of values of the phase due to the AFC drift from the relative oscillator offset.

TABLE 1

| | Phase | | | |
| --- | --- | --- | --- | --- |
| | 0 | 1 | 2 | 3 |
| I' | I | −Q | −I | Q |
| Q' | Q | I | −Q | −I |

The AFC rotation logic 1206 can also receive coarse AFC hypotheses as an input. The PN despreading array 1208 (FIG. 12) performs its despread operation for chip spaced hypotheses. The PN despreading array 1208 may receive current coarse AFC hypotheses, timing parity, timing phase, coherent integration length, and/or gold code selection as inputs. As the values are output for a given symbol, the sum is non-coherently accumulated for better metric reliability with the running sum stored in the non-coherent accumulation buffer 1210. The size of the buffer is based on the number of despread elements. In a representative embodiment, the PN despreading array 1208 may have 256 despread elements such that a pass through the sample buffer completes the coherent metric described above for 256 hypotheses. Alternatively, other numbers of despread elements may be used, and the metric may be completed for other numbers of hypotheses. A signal-to-noise ratio (SNR) metric may be used in transmission power control of the tag and for power control feedback to the AP. The hypotheses with the largest metrics are stored in a top N path data structure 1212 which is used to control the assignment of the dedicated fingers 1304 (FIG. 13). The top N paths can be N records including timing hypotheses, timing parity, coherent integration length, coarse AFC hypotheses, etc.

Figure 18:
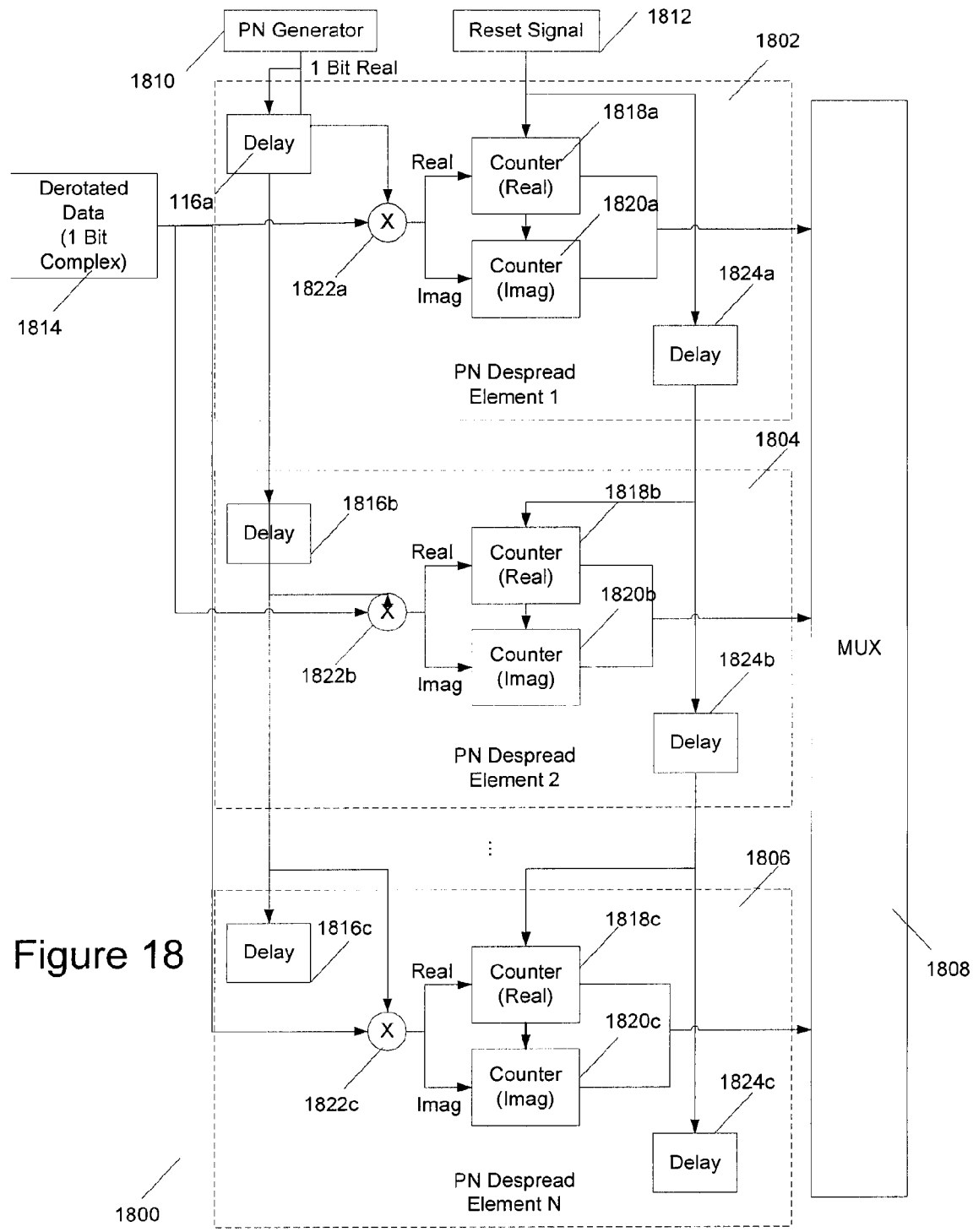
FIG. 18 is a diagram depicting a PN (pseudo noise) despread array in a representative embodiment.

FIG. 18 depicts a PN despread array 1800. There can be many instantiations (e.g., 256 or more in one embodiment) of pairs of counters for the complex despread operation. The PN despread array 1800 can be fed at chip rate with adjacent instantiations of PN despread elements 1802, 1804, and 1806 working on timing hypotheses that are a chip apart. The 1 bit complex data is sent from a block 1814 to elements 1802, 1804, and 1806 where it is combined with a PN signal from PN generator 1810. PN signal generator 1810 can be hardware that outputs the same sequence of 0s and 1s with which the AP is spreading the data. In the case of element 1802, the derotated data is combined (more specifically, 1 bit complex multiplied) with the PN signal at a combiner 1822a. Real and imaginary parts of this combination are separately input into counters 1818a and 1820a. The counters 1818a and 1820a shift the bit stream out upon receipt of a reset signal 1812. More specifically, the data in the counters is valid just prior to the reset signal. The reset signal forces zeros into both counters. The multiplexer 1808 allows for output of the currently valid counters for that finger that has uniquely finished its despreading operation at that particular clock. Other elements in the PN despread array 1800 operate similarly. Element 1804 receives derotated data from block 1814 and combines it with a PN signal after a delay is imposed by delay block 1816a in element 1802. The combination is entered into counters 1818b and 1820b, which gets shifted out of the counters upon a signal from the reset signal 1812 with an imposed delay from a delay block 1824a. Likewise, element 1806 receives derotated data from block 1814 and combines it with a PN signal after a delay is imposed by delay block 1816b in element 1804. The combination is entered into counters 1818c and 1820c, which gets shifted out of the counters upon a signal from the reset signal 1812 with an imposed delay from a delay block 1824b.

After a number of clocks corresponding to the coherent integration length, the PN despread element 1802 has valid data which is selected for output by a multiplexer 1808. The coherent integration length can be as large as the spreading factor and is set according to the acquisition rectangle described below. Every clock thereafter, the adjacent despread element 1804 or 1806 is available until all data has been output which can occur during the number of clocks corresponding to the coherent integration length plus a number of PN despread instantiations. The PN code that governs the operation of this mechanism can be a gold code parameterized by a value. In alternative embodiments, other PN codes may be used.

Figure 19:
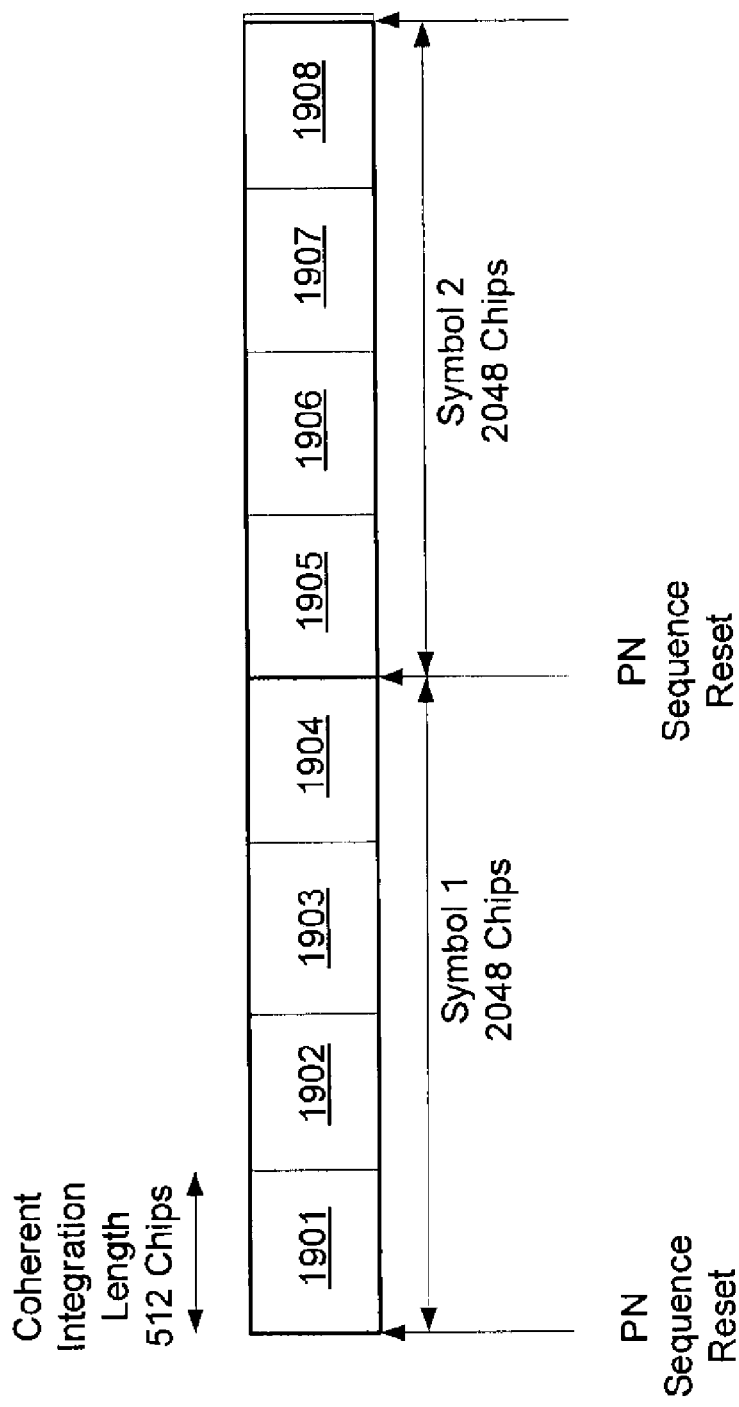
FIG. 19 is a diagram illustrating a symbol divided into smaller coherent units.

FIG. 19 illustrates a symbol carried on a signal that has been spread using a PN code. In the example, the signal has been divided into smaller coherent units. Each symbol 1900 on the signal is composed of a number of chips. In the depicted representative embodiment, the symbol is composed of 2048 chips. In alternative embodiments, other numbers of chips may be used. FIG. 19 shows two symbols subdivided into multiple coherent units 1901, 1902, 1903, 1904, 1905, 1906, 1907 and 1908. The symbol may be divided into more or less coherent units. Symbols may be larger or smaller than 2048 chips. More or less symbols may be used in the process. The PN despread array of FIG. 18 may be used to sum these coherent units by providing the counters 1818a and 1820a with a reset signal 1812 for each of the coherent units 1901, 1902, 1903, 1904, 1905, 1906, 1907 and 1908. Each of the coherent units may then be summed together non-coherently. The non-coherent sum only considers the magnitude of the signal carrying the symbol, not the data in the symbol. Thus, implementing the system of FIG. 19 detects whether energy is available and is more immune to phase differences in the received signal.

Figure 20:
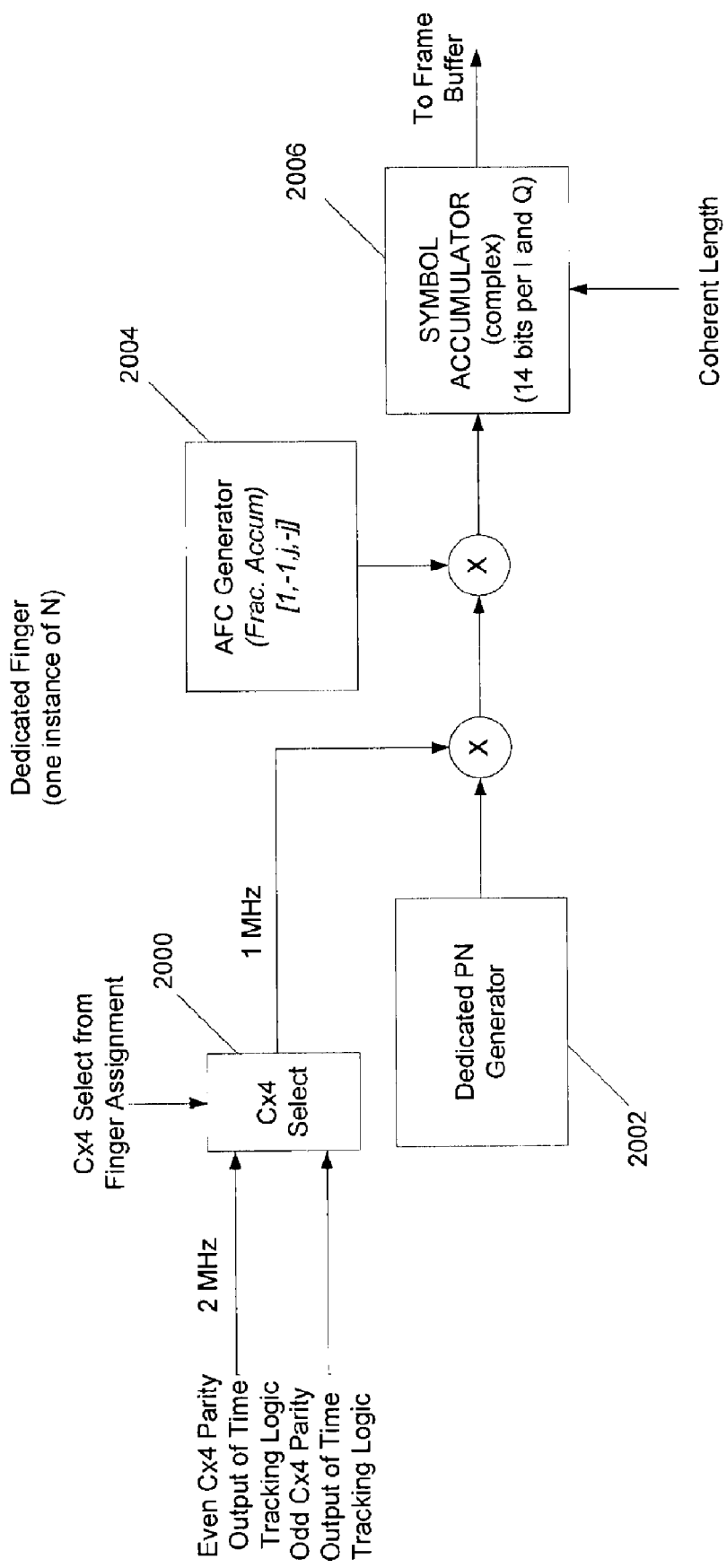
FIG. 20 is a diagram depicting a dedicated communication finger in a representative embodiment.

FIG. 20 illustrates a dedicated communication finger. Each dedicated finger has access to each of the 4 phases of chip×4 samples with a chip×4 selector 2000 set as part of the parameters of the finger assignment. Each finger has its own dedicated PN generator 2002 and AFC generator 2004 which is used to despread. The dedicated finger accumulates into the symbol accumulator 2006 based on the coarse AFC hypothesis, its chip×4 timing phase, the dependent variable of time-tracking rate, and then outputs a complex variable every coherent integration length number of clocks. The coherent length can be as large as the spreading factor but can be smaller depending on the stored results of the acquisition rectangle search. The dedicated fingers 1304 illustrated with reference to FIG. 13 can also receive inputs from the circular buffer 1300, and a PN code selection.

Referring again to FIG. 13, the output from the dedicated fingers 1304 goes through a bit-width squeezer 1306 that reduces the bit-widths for efficient storage in the frame buffer 1308 without sacrificing performance. The output from the bit-width squeezer 1306 is provided to the frame buffer 1308, which may be a circular buffer mechanism which allows for the general case of processing a 256 symbol frame as if the current symbol is the last symbol of the frame. When frame timing is known, this memory structure can support the specific processing of a frame with the known last symbol.

Frame buffer 1308 outputs the hypothesized frames to the rest of the receive chain. A cross product multiplication block 1310 performs the multiplication of the current symbol with the complex conjugate of the previous symbol which is the conventional metric for D-BPSK demodulation. A residual frequency drift may cause the D-BPSK constellation to be rotated by a fixed phase. The role of the fine AFC multiply block 1312 is to take a brute-force approach and try different possible phase rotations such that at least one fine AFC hypothesis yields a valid CRC as it passes through a de-interleaver and viterbi decoder 1314. The fine AFC multiply block 1312 can also receive fine AFC hypotheses as inputs. The output from the de-interleaver and Viterbi decoder 1314 is provided to a CRC checker 1316. If the CRC is valid, the payload is sent up to the MAC layer.

Figure 21:
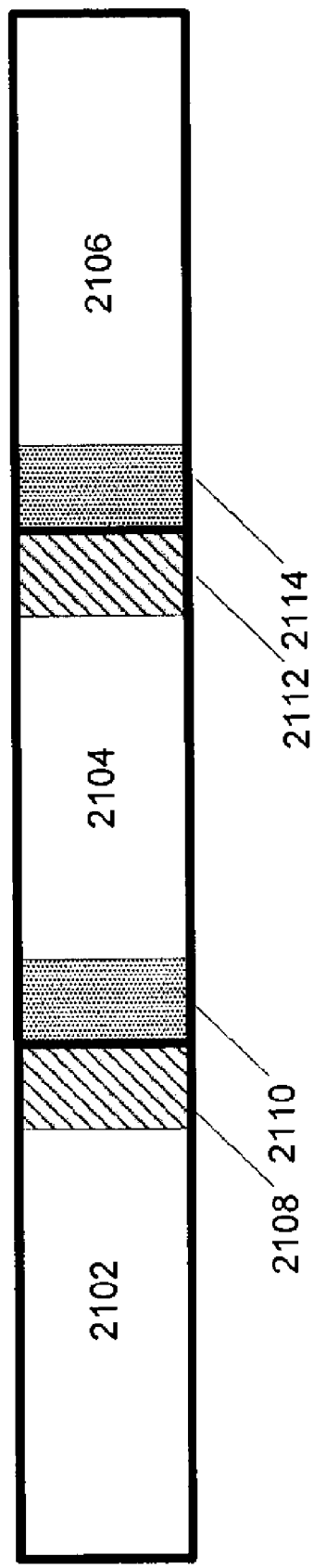
FIG. 21 is a diagram illustrating a reduced coherent integration demodulation on a per finger basis that maps to the frame buffer.

FIG. 21 illustrates a reduced coherent integration demodulation on a per finger basis that maps to the frame buffer. Symbol 2102, 2104 and 2106, which are emphasized through heavier line widths in the figure, are carried on a signal that has been spread using a PN code and may have a random timing offset. Symbol 2102, 2104 and 2106 are divided into smaller coherent units 2108, 2110, 2112 and 2114. FIG. 21 considers the boundaries of symbol 2104, however this system is applicable to all symbols. The PN despreader of FIG. 18 is used to produce sums over these smaller coherent units 2108, 2110, 2112 and 2114. The result of these smaller units may then be demodulated as in FIG. 13. The complex conjugate of the right-hand of a previous symbol is cross multiplied with the left-hand of a current symbol and fed into the fine AFC logic. By demodulating these smaller coherent units among the advantages obtained is increased resistance to phase variations introduced by, for example, doppler effects.

Figure 22:
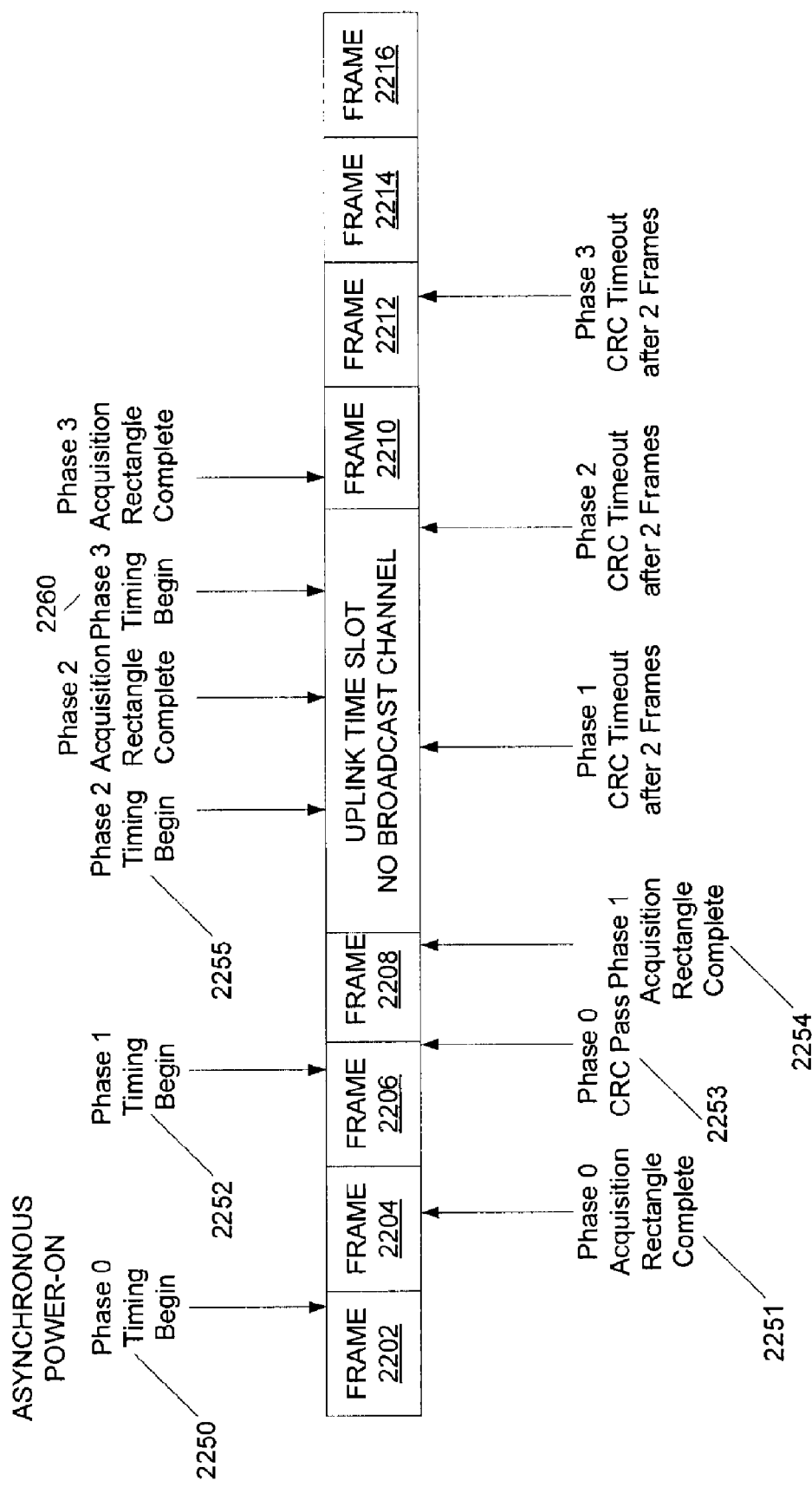
FIG. 22 is a diagram illustrating how a node can perform cold acquisition and determine frame timing given a representative embodiment.

FIG. 22 illustrates how a node can perform cold acquisition and determine frame timing given a representative embodiment. In the representative embodiment, the frame structure shows the repetition of 4 consecutive broadcast channel frames 2202, 2204, 2206, and 2208. These four frames are followed by an uplink period of time where no broadcast channel is active and by the next four broadcast channel frames 2210, 2212, 2214, and 2216. Cold acquisition requires both a successful acquisition and a successful demodulation of the broadcast channel. The frame timing is not initially known so a scheme that attempts four different phases is employed. The goal is that at least one of these different phases results in both valid acquisition and valid demodulation. Shown is an example where a frame asynchronous event sets phase 0 at time 2250. The other 3 phases are derived from this asynchronous event via separation by a 2 frame duration. These phases are valid acquisition starting points which may be at any number of uplink/downlink repetitions in the future. It is not necessary to perform the acquisition attempts for given phases in any particular order.

An acquisition process that begins at Phase 0 in this example results in the valid chip timing and coarse AFC hypothesis to occur at time 2251. The chip timing and course AFC hypothesis are used in the finger assignments that begins at time 2251. At this point, frame timing is not known so each arriving symbol is postulated to be the last symbol of the frame. When the last symbol of a frame arrives, the CRC (cyclic redundancy check) passes and thus, frame timing is known at time 2253.

Acquisition for Phase 1 begins at time 2252 but fails to yield valid CRCs and thus frame timing. The Phase 1 acquisition rectangle successfully completes at time 2254 and a few valid symbols are output by the dedicated fingers. However, the Broadcast channel disappears before a full frame can be demodulated. After 2 full frame durations elapse with no successfully demodulated frames (no CRC test pass) a time-out condition occurs and no frame timing is learned.

Acquisition on Phase 2 at time 2255 and Phase 3 at time 2260 yields a condition where there is no Broadcast Channel present to perform acquisition rectangle processing upon. In this example, the result is randomized dedicated finger assignments based strictly upon noise. The result is that even though the Broadcast Channel may resume, the finger assignments are such that no valid demodulation occurs and thus no frame timing is learned.

Figure 23:
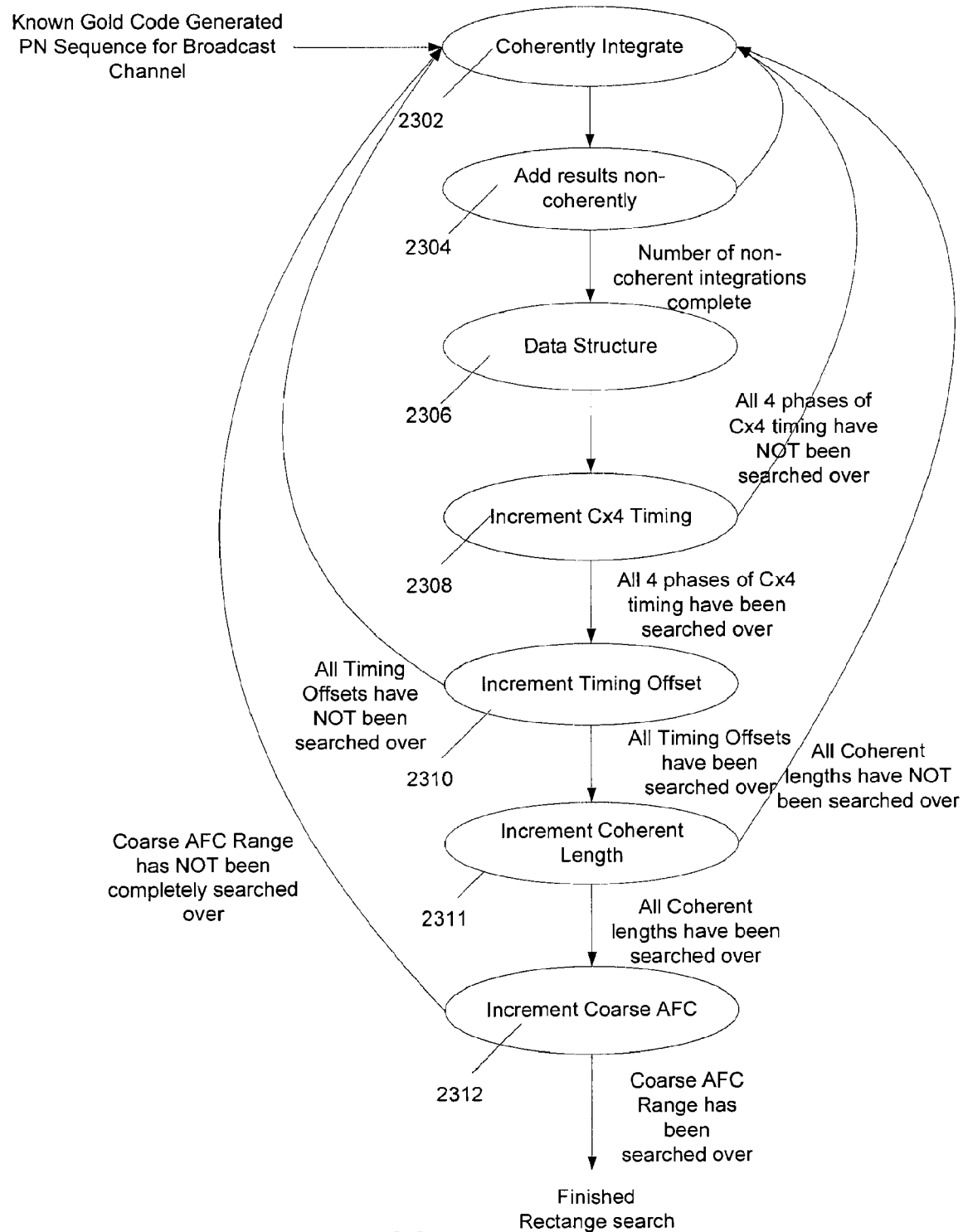
FIG. 23 is a flow diagram illustrating rectangle acquisition processing operations.

FIG. 23 illustrates rectangle acquisition processing described subsequently in operation 2404 of FIG. 24. Additional, fewer, or different operations may be performed depending on the particular embodiment. The operations may also be performed in a different sequence than that shown and described.

First, at state 2302, the PN despread array is used to obtain 64 coherent energies spaced a chip apart each. Because one coherent despread does not necessarily yield good enough acquisition performance in low SNR, the energy is accumulated non-coherently in state 2304. Upon completion of each non-coherent accumulation, the PN despread array is re-entered until the desired number of non-coherent accumulations has been reached. Once the non-coherent results are fully accumulated a top N structure shown in state 2306 is updated. The top N non-coherent energies with the accompanying acquisition information of sub-chip timing, chip timing, coherent integration length, and coarse AFC are maintained in this data structure. After the data is written, the subchip timing is adjusted by a C×4 phase (at state 2308) and the PN Despread block is re-entered with all the non-coherent energies having been reset back to zero. The acquisition process of accumulating energy non-coherently then repeats itself with all the C×4 phases being searched over. Once all the C×4 phases are complete, the chip timing is adjusted by 64 chips and the C×4 phase is reset back to zero (at state 2310). The previous process repeats itself with all 4 C×4 phases once again being searched over at the new chip timing. Once all timing offsets have been searched over, the coherent length is adjusted (at state 2311) and both the timing offset and C×4 phase are reset. Adjusting the coherent length gives the processing some resilience to doppler induced signal problems. This process is further explained in FIG. 19. Once a smallest coherent integration length has been searched, the coarse AFC is adjusted (at state 2312) and the previous process repeats with all chip timings, C×4 phases and coherent lengths being searched over in states 2302, 2304, 2306, 2308,

2310, 2311 and 2312. The process repeats until every desired coarse AFC within the coarse AFC range has been searched.

Figure 24:
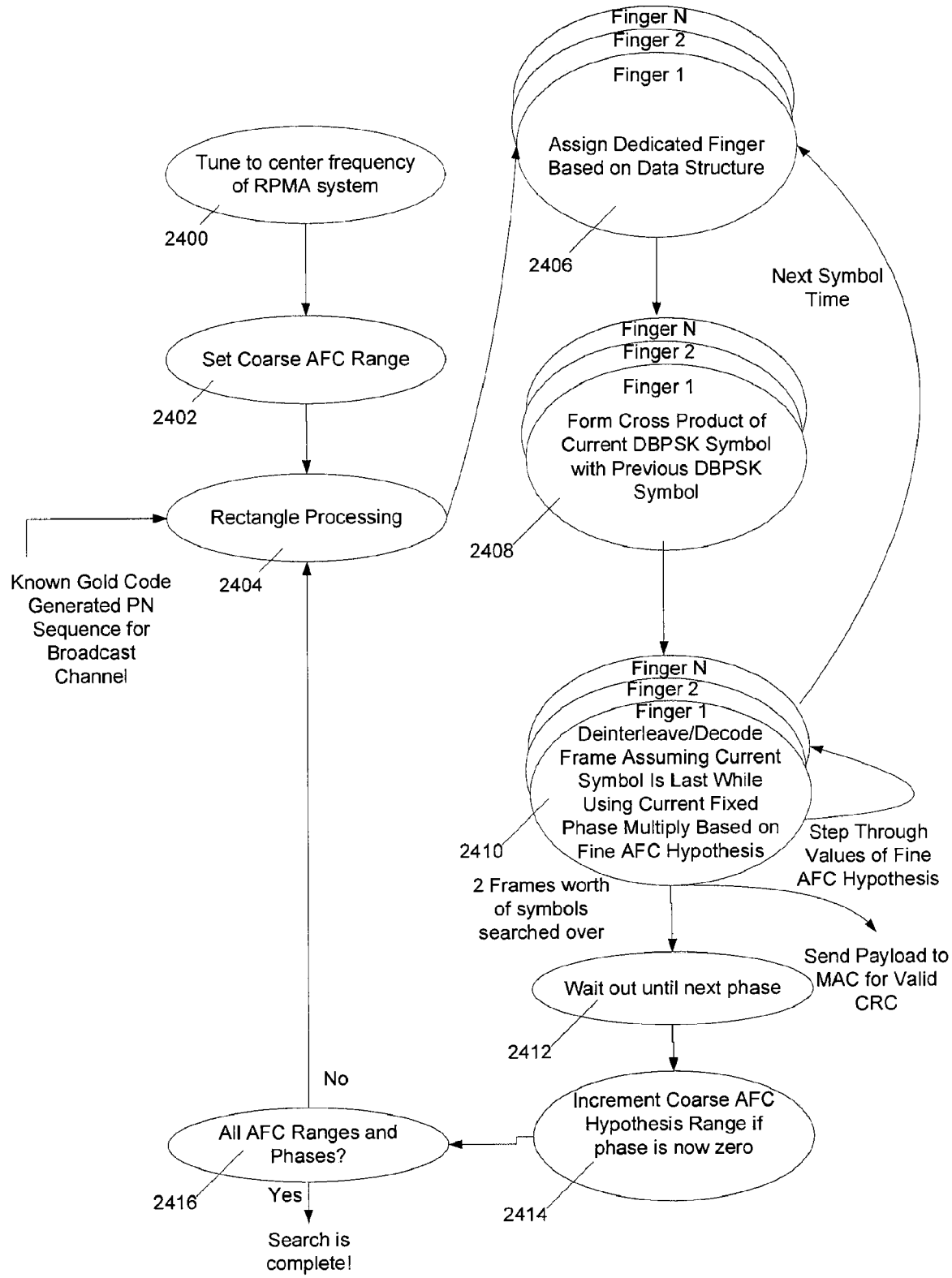
FIG. 24 is a flow diagram depicting operations performed in the tag processing of a dedicated channel from a cold acquisition in a representative embodiment.

FIG. 24 illustrates the operations used to perform cold acquisition in an illustrative embodiment. In an operation 2400, cold acquisition begins with the modem being turned on and the receive radio being tuned to the center frequency of the RPMA system. In an operation 2402, a coarse AFC range is set such that the acquisition rectangle will be completed in one frame duration minus some small delta. In an operation 2404, rectangle processing is performed as described above in reference to FIG. 23. The rectangle processing is complete when every desired coarse AFC within the coarse AFC range has been searched.

In an operation 2406, dedicated fingers are assigned based on the data structure. In an operation 2408, symbol cross products are created using current DBPSK and previous DBPSK. An output of operation 2408 can be a complex cross product from each dedicated finger. In an operation 2410, frames are interleaved and decoded. For any valid CRC, the payload can be sent to a medium access control (MAC) layer. In an operation 2412, frame decoding has taken place over two frame durations and the cold acquisition process times out until the next phase. In an operation 2414, the next coarse AFC hypothesis range is set if the new phase is phase 0. For this illustrative embodiment, this means that a coarse AFC hypothesis range is adjusted every four cycles through this operation. In an operation 2416, the system tests whether all AFC ranges and phases have been searched. If not, the system goes back to operation 2404 and performs a new rectangle acquisition. If the entire AFC hypothesis range has been tested for all four phases described in FIG. 22, then the search is complete and the process ends.

Figure 25:
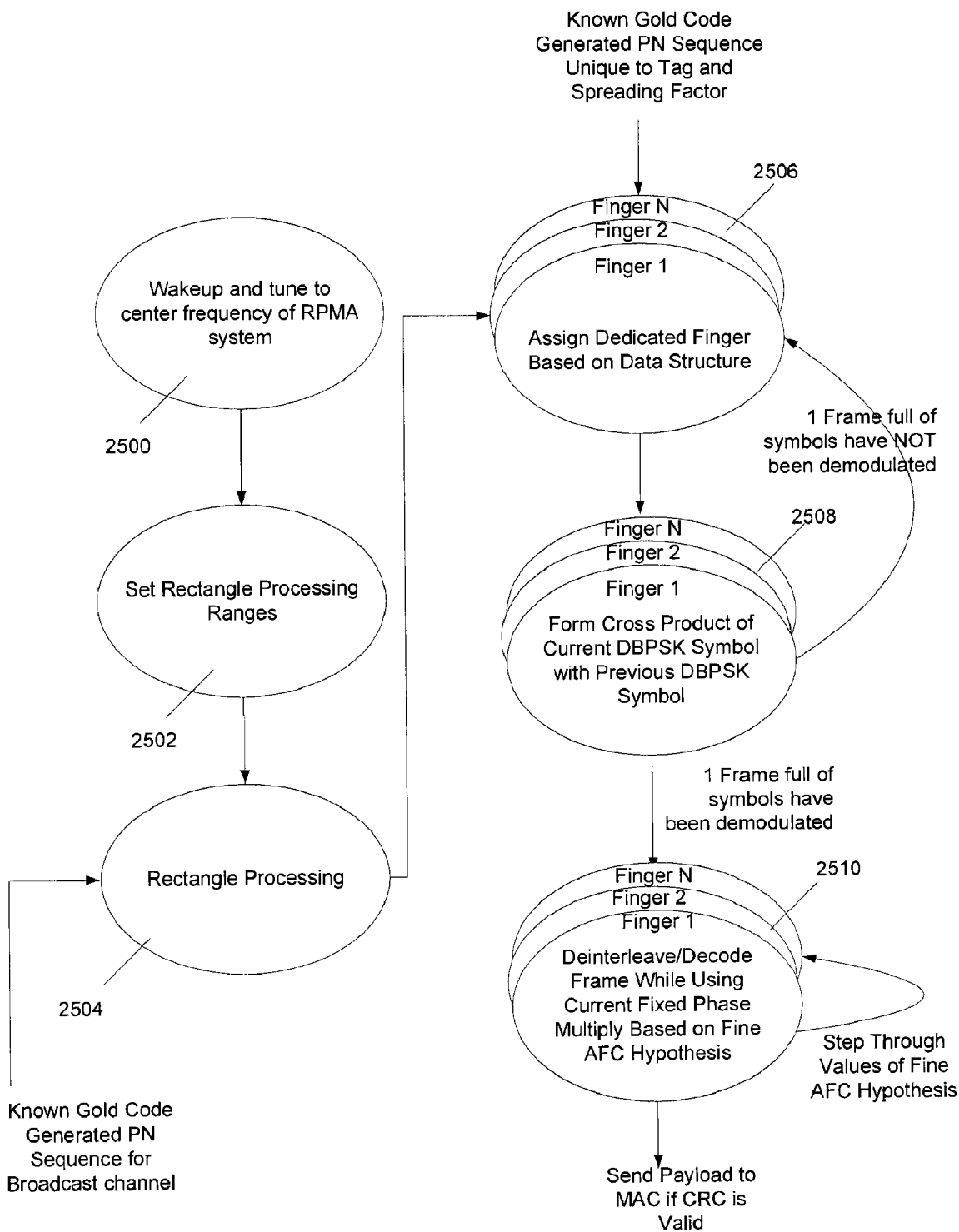
FIG. 25 is a flow diagram depicting operations performed in dedicated channel processing in a representative embodiment.

FIG. 25 illustrates dedicated channel processing along with warm acquisition in a representative embodiment. Dedicated channel processing proceeds along a very similar state path as does the cold acquisition previously described. Additional, fewer, or different operations may be performed depending on the particular embodiment. The operations may also be performed in a different sequence than that shown and described.

In an operation 2500, the radio is tuned to the RPMA center frequency. Next, in an operation 2502 a coarse AFC range, timing offset range, and coherent length range are set for the subsequent acquisition search in an operation 2504. Unlike cold acquisition, only one range is set for the entire state process. Operation 2504 is further illustrated in FIG. 23 and is described above. Operations 2506 through 2510 are similar to cold acquisition with the exception that only one frame timing is decoded. This is performed when a full frame of symbols have been demodulated. The other difference is that operation 2506 receives a different Gold Code input than that of acquisition, namely the Gold Code of the Dedicated Channel.

Figure 26:
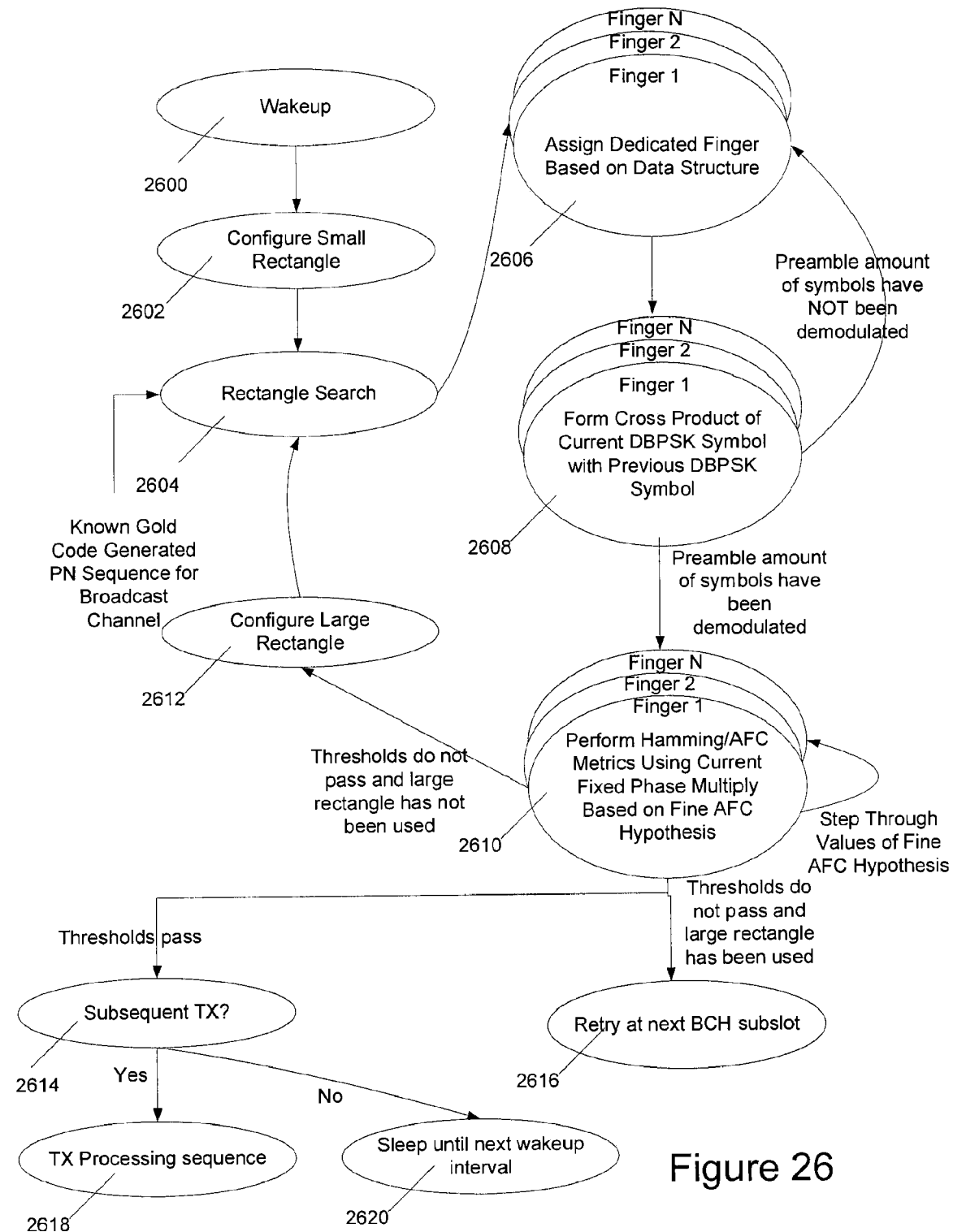
FIG. 26 is a flow diagram depicting operations performed in preamble processing with and without subsequent transmit operations.
Figure 27:
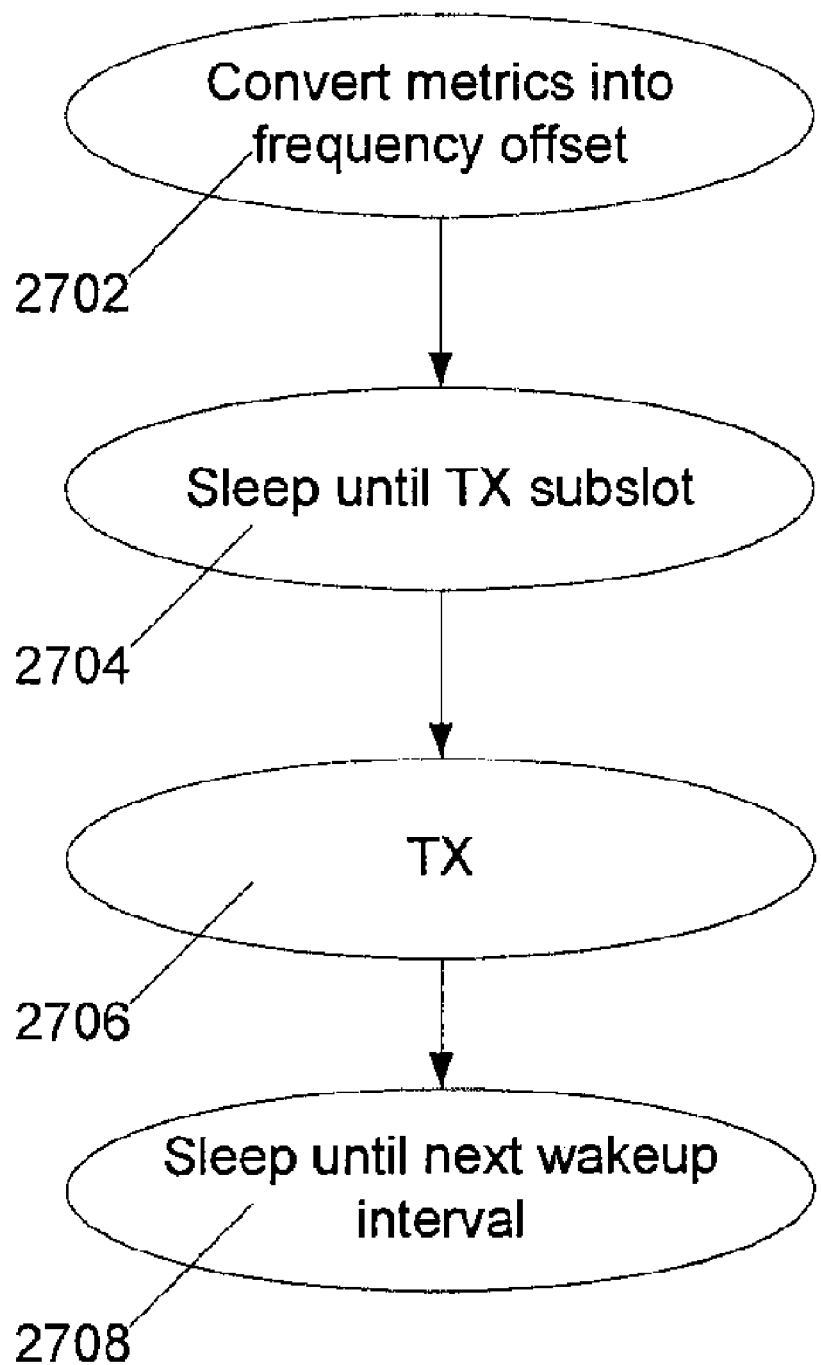
FIG. 27 is a flow diagram depicting operations that expand on the transmit operations of FIG. 26.

FIG. 26 and FIG. 27 illustrate preamble processing with and without subsequent transmit operations. Preamble processing starts along a very similar state path as does dedicated channel processing. Additional, fewer, or different operations may be performed depending on the particular embodiment. The operations may also be performed in a different sequence than that shown and described.

In an operation 2600, the modem wakes up after having been in sleep mode, tunes to the RPMA center frequency, and fills its circular buffer with samples around and containing the over-the-air preamble. Unlike both cold acquisition and dedicated channel processing, once the circular buffer has been filled with sufficient samples for searching the buffer is frozen, and each subsequent search takes place over the same set of samples. In an operation 2602, a small rectangle of coarse AFCs and timing offsets are configured that handles the normal timing drift induced from an inaccurate frequency offset from the radio's frequency source. In an operation 2604, a rectangle search of the AFC range, timing, and integration length is performed which is described above in reference to FIG. 23. In an operation 2606, the dedicated fingers are assigned according to the top N data structure. In an operation 2608, demodulation proceeds until a preamble amount of symbols have been demodulated. In an operation 2610, the hamming and AFC metrics are calculated for each fine AFC hypothesis.

There are three possible outcomes of the hamming and AFC metrics. If the hamming and AFC metrics are such that the thresholds are not passed and only a small rectangle search has previously been conducted, then, in an operation 2612, a large rectangle of a larger timing offset and coarse AFC range is configured. The integration lengths are configured the same as in the small rectangle search. Operation 2604, 2606, 2608 and 2610 are then repeated using the larger timing offset and AFC range rectangle. If the larger rectangle search also yields metrics that do not pass the thresholds, in an operation 2616, any subsequent transmit operation is aborted and preamble acquisition is retried at the next available BCH (broadcast channel) subslot. This is the second possibility upon exiting operation 2610. In some embodiments, it is possible for more than two different rectangle sizes to be searched over before aborting the preamble acquisition. The third case is that the thresholds pass. In the case where there is a subsequent transmit operation, in an operation 2618, further illustrated in FIG. 27. In FIG. 27 at operation 2702, the metrics are converted into a transmit frequency offset that is used for transmit AFC rotation, transmit time tracking, a spreading factor selection, and modulation type (DBPSK or 2-ary) for robustness in the presence of doppler errors. In an operation 2704, the transmitter waits until the next transmit subslot. In an operation 2706, transmit occurs at the next transmit subslot. Finally, in operation 2708, the node returns to sleep. Where there is no subsequent transmit, the node sleeps until operation 2600 in FIG. 26 is next scheduled.

Figure 28:
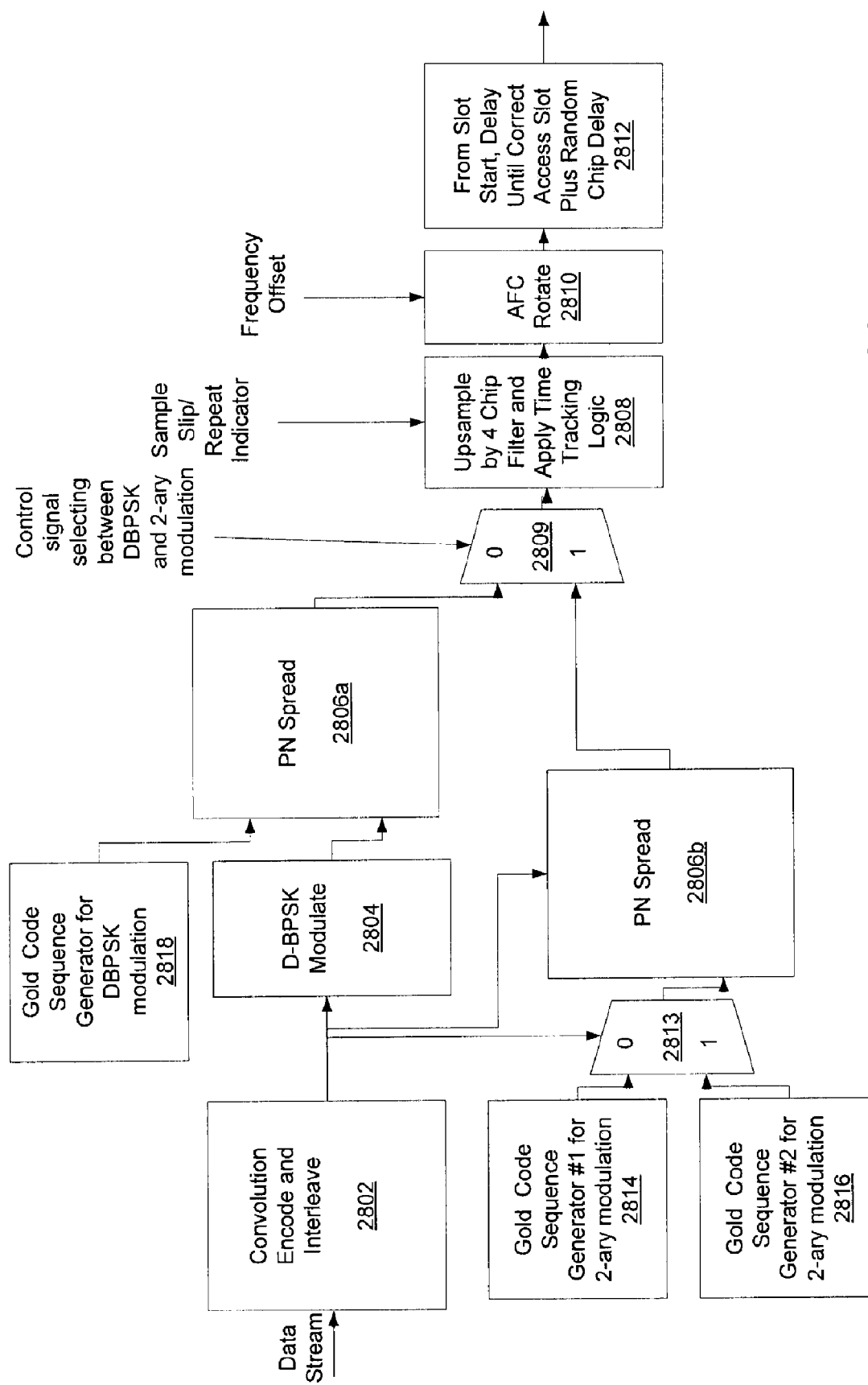
FIG. 28 is a diagram depicting an uplink transmitter according to a representative embodiment.

FIG. 28 illustrates an uplink transmitter 2800 which includes structures such as a convolution encoder, an interleave module, a DBPSK (differential binary phase shift keyed) and 2-ary modulator, a pseudo-noise spreader, a filter, a bank of taps, an automatic frequency control (AFC) rotator, and other such structures. The transmit path of uplink transmitter 2800 is a coded and spread spectrum waveform. In a representative embodiment, the uplink transmitter 2800 can be included in a node that communicates with an access point along with other nodes using demodulated communication channels. Additional, fewer, or different operations may be performed by the uplink transmitter 2800 depending on the particular embodiment. The operations may also be performed in a different order than that shown and described. As used herein, a node or tag can refer to any communications device configured to receive signals from and/or send signals to an access point. The access point can refer to any communications device configured to simultaneously communicate with a plurality of nodes or tags. In a representative embodiment, the nodes can be mobile, low power devices which run off a battery or other stored power, and the access point can be located in a central location and receive power from a power source such as a wall outlet or generator. Alternatively, the nodes may plug into an outlet and/or the access point may run off of a battery or other stored power source.

In block 2802, a data stream is received by a convolution encoder and interleave module. In one embodiment, the data stream is 128 Bits including the preamble. Alternatively, data streams of other sizes may be used. Once received, the data stream is encoded using the convolution encoder. In a representative embodiment, the data stream may be encoded at a rate of ½. Alternatively, other rates may be used. The data stream can also be interleaved using the interleave module. An encoded symbol stream is output to operations where alternative modulation techniques can be used. In one path, a DPBSK modulator 2804 followed by a PN spreader 2806*a* modulates and spreads the encoded symbol stream. The PN spreader 2806*a* takes as input an orthogonal or quasi-orthogonal bit stream. In one representative embodiment, gold code sequence generator 2818 is used. In another path, a 2-ary modulation is accomplished by sending the encoded symbol stream to a selector 2813 which selects between two orthogonal or quasi-orthogonal sequences. In one representative embodiment, gold code sequence generator 2814 and 2816 are used. The output of the selector 2813 is spread in PN spreader 2806*b*. Modulation Select 2807 allows the transmitter to select between the alternative modulation techniques. Selection may occur when a doppler phase error has been detected and may be based on the doppler phase error detected. 2-ary modulation allows the system to gain robustness to Doppler induced phase errors at the cost of some signal power. By allowing the system to select alternative modulation techniques, the system can adaptively choose the best modulation technique for particular situations. The selection of modulation techniques can be based on either apriori knowledge or determined characteristics of the system. The modulation selection process may be based on known problems with the signal propagation or on detected problems with the signal propagation. For example, the system may select to use 2-ary modulation when it determines that Doppler induced phase errors are interfering with DBPSK demodulation. This may be determined via the preamble processing as described above. In other representative embodiments, other modulation techniques may be used. The system may select a different modulation technique for a different symbol stream and then modulate the different symbol stream with the selected modulation technique.

In both of the modulation techniques illustrated in FIG. 28, a PN spreader spreads the symbol stream prior to transmission. In a representative embodiment, the PN spreader can use a common network gold code channel using a selected spreading factor. The spreading factor can be a member of the set {64, 128, 256, . . . , 8192}. Where two PN codes are required, any orthogonal or quasi-orthogonal set of PN codes may be selected. Alternatively, any other code and/or spreading factor may be used. In one technique, each node can randomly select when to begin transmission using the same PN sequence. In another technique, a PN sequence and a random chip offset into that sequence may be chosen. The large range of possible randomly selected chip offsets increases the probability that a particular frame will not collide (or, in other words, have the same chip timing at the access point) with another frame from another transmitter. The probability of collision may become non-negligible (~10% or less) when many nodes are put onto the system and can be solved via retransmission of the same frame at a new random offset. In a representative embodiment, an output of block 2808 can have a rate of 1 bit at 1 mega-chip per second (Mcps). Alternatively, other rates may be used.

At block 2808, the data stream is upsampled by a 4× oversample filter and time tracking logic is used to ensure that all of the frames land at the same sample rate consistent with the frequency reference of the AP. Block 2808 receives a sample slip/repeat indicator as an input. In one embodiment, an output of block 2808 may have a real frequency of approximately 4 megahertz (MHz). At block 2810, an automatic frequency control (AFC) rotation is done including a frequency offset to match the combination of the node and access point's total frequency offset, ensuring that all of the frames from all of the users land near zero frequency offset. In one embodiment, an output of block 2810 may have a complex frequency of approximately 4 MHz. At block 2812, a delay is imposed from the start slot until the correct access slot occurs. In addition, a random chip delay is imposed on the signal. In a representative embodiment, the random chip delay can be from 0 to the spreading factor minus 1. Alternatively, a different random chip delay may be used. The slot access can be described by A(i,j) where i is related to the spreading factor as $2^{(13-i)}$ and j is the sub-slot number corresponding to non-overlapping slots. Depending upon the selected spreading factor, there are generally multiple transmit opportunities in a given slot. For the uplink, the access slot can be randomly selected along with a chip offset from 0 to spreading factor minus 1. The node may transmit in multiple sub-slots per slot, as long as these sub-slots do not overlap. As such, the probability of collision between uplink users is minimized, while allowing for re-selection for cases where there are collisions. After the signal has been delayed, the signal can be transmitted to an access point.

Figure 29:
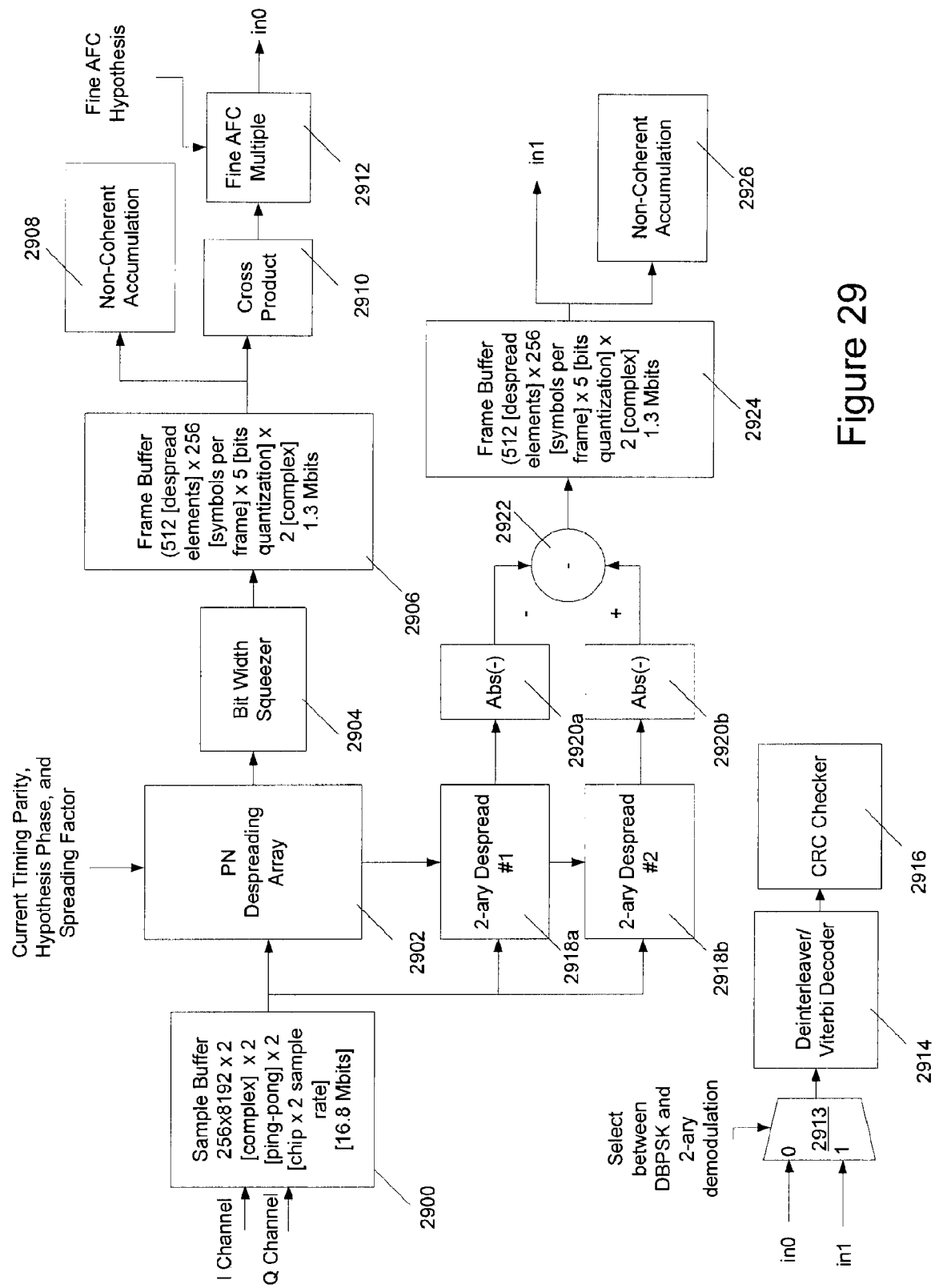
FIG. 29 is a diagram depicting an access point receive data path in a representative embodiment.

FIG. 29 depicts an access point (AP) receive data path. Unlike the node, an entire frame at the largest spreading factor may be stored in a ping-pong buffer scheme in a sample buffer 2900. This buffer scheme may use a substantial amount of memory (e.g., 16.8 Mbits) and in at least one embodiment, it may be stored in a dedicated off-chip memory device. The sample buffer block 2900 includes representative values. In alternative embodiments, other values may be used. Unlike the tag, the time tracking logic and the AFC rotation logic may not need to be used since the AP can be the master time reference. The sample buffer 2900 passes frames to a PN despreading array 2902, which can perform brute force testing as described in relation to FIG. 18. The PN despreading array 2902 may include 256 despread elements. Alternatively, any other number of despread elements may be used. The sample buffer 2900 also passes frames to 2-ary despread array 2918*a* and 2918*b*. The 2-ary despread arrays 2918*a* and 2918*b* use the orthogonal or quasi-orthogonal bit streams used by the node in modulating the signal. The PN despreading array 2902 and 2-ary despread arrays 2918*a* and 2918*b* may also receive current timing parity (which may be chip×2 resolution only), hypothesis phase, and/or spreading factor as inputs.

An output from the PN despreading array 2902 is provided to a bit width squeezer 2904. The bit width squeezer 2904 reduces the size of the frames, which are then sent to a frame buffer 2906. The frame buffer block 2906 includes representative values. In alternative embodiments, other values may be used. Depending on the embodiment, the frame buffer 2906 may also be stored in a dedicated off-chip memory device. The frame buffer 2906 output may be sent to a non-coherent accumulation block 2908 to determine an SNR metric such as signal strength for use in transmission power-control feedback to the tag. The rest of the system is similar to the tag's receive processing where fine AFC hypotheses are iterated upon (operations 2910 and 2912).

After despreading in the 2-ary despreaders 2918*a* and 2918*b*, the absolute value of each output is taken in abs 2920*a* and 2920*b*. At combiner 2922 one despread data stream from 2920*a* is subtracted from the other despread data stream from 2920*b*. The result is placed into a frame buffer 2924, which may be the same frame buffer as 2906 or may be a frame buffer substantially similar to 2906. The frame buffer 2924 output may be sent to a non-coherent accumulation block 2926 to determine an SNR metric such as signal strength for use in transmission power-control feedback to the tag.

The result of the AFC rotated DPBSK demodulation and the 2-ary demodulation is selected at selector 2913. Selector 2913 also takes a control signal that indicates which modulation scheme should be selected. All payloads with valid CRCs being passed up to the AP's MAC (operations 2914 and 2916). A non-coherent accumulation 308 is used to determine an SNR metric such as signal strength for use in transmission power-control feedback to the tag.

Figure 30:
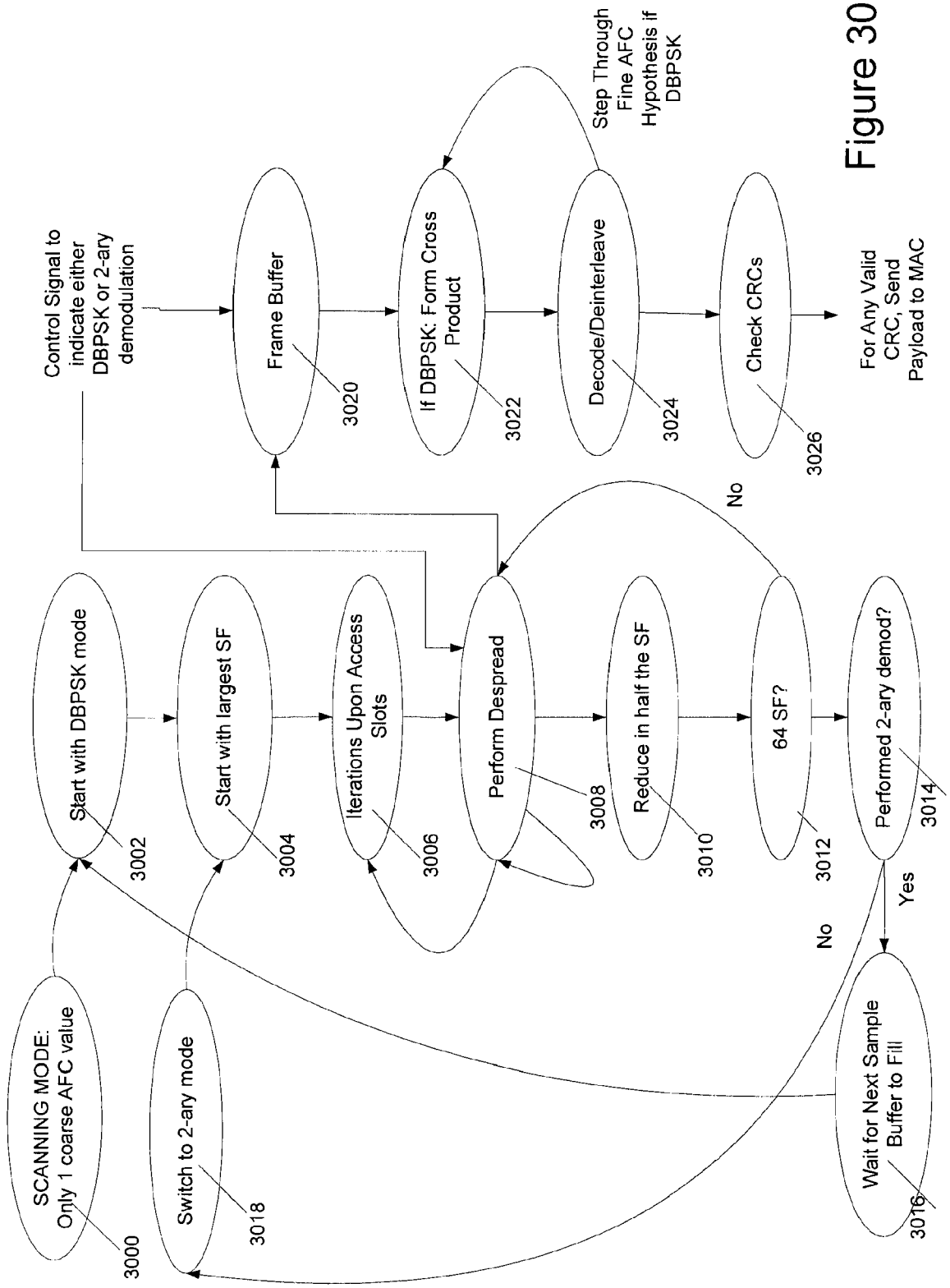
FIG. 30 is a flow diagram depicting operations performed during access point receive processing in a representative embodiment.

FIG. 30 is a flow diagram depicting operations performed during access point receive processing in a representative embodiment. The flowchart of FIG. 30 illustrates the searching of a multi-dimensional space. The illustrated search shows an example of the ordering of iterating upon all possible chip×2 timing offsets, spreading factors from a set of possible spreading factors, access slot numbers for spreading factors less than the maximum and modulation schemes. The AP then performs the similar fine AFC search that the tag performs to allow for a small amount of frequency drift between the timing sources of the tag and the AP to occur since the last transaction. All valid CRCs are passed up to the MAC layer.

In an outermost loop, two possible modulation techniques are searched: DPBSK (differential binary phase shift keying) and 2-ary modulation. In an inner loop, all possible spreading factors are searched. In a representative embodiment, there may be 8 spreading factors [64, 128, 256, 512, 1024, 2048, 4096, 8192]. Alternatively, other spreading factors and/or numbers of spreading factors may be used. In another inner loop, all possible sub-slots for a given spreading factor are searched. For example, there may be 128 possible sub-slots for a 64 chip spreading factor and a single degenerate sub-slot for a 8192 chip spreading factor. In another loop, all possible chip×2 timing phases within a given sub-slot are searched. As described in more detail below, the various loops are illustrated by the arrows in FIG. 30.

In an operation 3000, one coarse AFC value is used. In a representative embodiment, the one coarse AFC value can be 0 since compensation is performed by the tags. In an operation 3002, the receiver is set to demodulate DBPSK modulation first. In an operation 3004, a largest spreading factor (e.g., 8192) is used as a starting point. In alternative embodiments, the largest spreading factor may be larger or smaller than 8192. In an operation 3006, access slots are processed within a spreading factor. This process may be degenerate in the case in which there are 8192 spreading factors. In an operation 3008, despreading is performed for all chip×2 spaced hypotheses at the current spreading factor. For example, 16,384 despread operations (operation 3008) may be performed if the spreading factor has a length of 8192. In an operation 3008, despreading also takes a control signal indicating whether DBPSK despreading or 2-ary despreading is being performed. Operation 3008 may be repeated when the size of the PN despread array is not sufficient to despread all chip hypotheses for a given spreading factor in a single operation. Once all chip hypotheses for a given spreading factor have been searched in a given subslot, operation 3006 may be repeated if more access slots need to be searched. In an operation 3010, the spreading factor (SF) is reduced in half and processing continues. In an operation 3012, a determination is made regarding whether the spread factor has been reduced to 64. In alternative embodiments, other predetermined values may be used. If the spreading factor has not been reduced to 64 (or other predetermined value), processing continues at operation 3008. Once the spreading factor has been reduced to 64, the system tests to determine if 2-ary modulation has been completed in an operation 3012. If it has not, the modem is switched to demodulate 2-ary modulation in operation 3018 and demodulation continues in 3004. If the spread factor has been reduced to 64 and both modulation techniques have been attempted, the system waits for a next sample buffer to fill in operation 3016. Once the next sample buffer is filled in operation 3016, control returns to operation 3002 where DBPSK and 2-ary demodulation are attempted again.

In an operation 3020, a frame buffer of despread elements is obtained. The frame buffer size corresponds to the number of despread elements and the frame size in symbols. In a representative embodiment, the frame buffer would have 256 columns, representing each of the despread elements, by 256 rows, representing the number of symbols in a frame. The frame buffer may be complete after 256 symbols are output from 256 single passes by the PN despread array. In one embodiment, for a 256 stage PN despread array, 256 passes through may produce 256 timing hypotheses each having 256 symbols. In alternative embodiments, the PN despread array may have more or fewer stages. If an embodiment is demodulating DBPSK symbols, a cross product of the current despread DBPSK symbol with the previous symbol is calculated in an operation 3022. In one embodiment, the cross product may involve 256 symbols for up to 256 frames. Alternatively, other numbers of symbols and/or frames may be used. If the mode of operation is 2-ary, then operation 3022 is skipped. In an operation 3024, the current frame is decoded/deinterleaved and phase multiplied based on the AFC hypothesis or alternatively the 2-ary output. With DBPSK demodulation, operations 3024 and 3022 may be repeated for alternate fine AFC hypotheses. In an operation 3026, CRCs are checked and for any valid CRC, the payload is sent out of the physical layer (PHY) and up to the medium access control (MAC). As an example, the CRCs may be checked for 256 times the number of fine AFC hypotheses for each pass of a 256 despread array and may be checked for each of the 2-ary demodulations. Upon completion of the process for a given slot, the process is performed for subsequent slots.

The method of communication described above may be implemented in a spread spectrum communication system. The method of receiving a signal and compensating for doppler phase errors may be implemented on all the devices of a system, including tags, access points and any other device communicating in the system. Each device of the system, including tags, access points and any other device communicating in the system, may contain a processor, a receiver, and a transmitter. The processor may be composed of a general purpose processor or implementation specific logic circuits designed to implement the method described above. The receiver may be configured to receive spread spectrum communication that may include a random timing offset. The corresponding transmitter on communicating devices may transmit the spread spectrum communication, also possibly including the random timing offset. The processor on the receiving device may then perform the operations described above to improve reception and to improve transmission methods in the face of doppler phase errors.

The foregoing description of representative embodiments has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. In addition, one or more flow diagrams were used herein. The use of flow diagrams is not intended to be limiting with respect to the order in which operations are performed.

What is claimed is:

1. A method of compensating for induced doppler phase errors while communicating through a multiple access spread spectrum communication interface, the method comprising:
   receiving a first signal at a receiver, wherein the first signal is spread using a predetermined pseudo-noise (PN) code;
   dividing the first signal into a plurality of first smaller coherent units;
   summing across each of the plurality of first smaller coherent units to produce a plurality of first coherent sums;
   summing non-coherently the plurality of first coherent sums to detect a magnitude of the first signal;
   selecting a coherent integration length based on the magnitude of the first signal to configure a demodulation;
   receiving a second signal at the receiver, wherein the second signal is spread using the predetermined pseudo-noise (PN) code;
   dividing the second signal into a plurality of second smaller coherent units; and
   demodulating a first symbol from the plurality of first smaller coherent units and the plurality of second smaller coherent units comprises cross multiplying the complex conjugate of a unit of the first smaller coherent units with a unit of the second smaller coherent units.

2. The method of claim 1, wherein the demodulation of the first symbol relies on a first unit of the plurality of first smaller coherent units and a last unit of the plurality of second smaller coherent units.

3. The method of claim 1, wherein the first signal neighbors the second signal in a sequence of signals.

4. The method of claim 1, wherein the first signal has a first random timing offset.

5. The method of claim 1, wherein the second signal has a second random timing offset.

6. The method of claim 1, further comprising:
   detecting an induced doppler phase error in the first signal;
   selecting a modulation technique from a plurality of modulation techniques from among the following modulation techniques: differential binary phase shift keyed modulation or 2-ary modulation;
   encoding a symbol stream using the selected modulation technique; and
   transmitting the encoded symbol stream.

7. The method of claim 6, further wherein the selected modulation technique is based on the detected induced doppler phase error.

8. The method of claim 6, further comprising:
   selecting a second modulation technique from the plurality of modulation techniques; and
   encoding a second symbol stream using the selected second modulation technique.

9. A device for communicating in a spread spectrum system comprising:
   a receiver in communication with a processor and configured to receive a first signal and a second signal, wherein the first signal is spread using a predetermined pseudo-noise (PN) code and the second signal is spread using the predetermined pseudo-noise (PN) code; and
   a processor operatively coupled to the receiver and configured to:
      divide the first signal into a plurality of first smaller coherent units,
      sum across each of the plurality of first smaller coherent units to produce a plurality of first coherent sums;
      sum non-coherently the plurality of first coherent sums to detect a magnitude of the first signal;
      select a coherent integration length based on the magnitude of the first signal to configure a demodulation;
      divide the second signal into a plurality of second smaller coherent units; and
      demodulate a first symbol from the plurality of first smaller coherent units and the plurality of second smaller coherent units comprises cross multiplying the complex conjugate of a unit of the first smaller coherent units with a unit of the second smaller coherent units.

10. The device of claim 9, wherein the first signal has a first random timing offset.

11. A spread spectrum communication system comprising:
   a device having a receiver configured to receive a first signal and a second signal, wherein the first signal is spread using a predetermined pseudo-noise (PN) code and the second signal is spread using the predetermined pseudo-noise (PN) code; and a processor operatively coupled to the receiver and configured to:
      divide the first signal into a plurality of first smaller coherent units;
      sum across each of the plurality of first smaller coherent units to produce a plurality of first coherent sums;
      sum non-coherently the plurality of first coherent sums to detect a magnitude of the first signal;
      select a coherent integration length based on the magnitude of the first signal to configure a demodulation;
      divide the second signal into a plurality of second smaller coherent units; and
      demodulate a first symbol from the plurality of first smaller coherent units and the plurality of second smaller coherent units comprises cross multiplying the complex conjugate of a unit of the first smaller coherent units with a unit of the second smaller coherent units; and
   an access point in communication with the device, wherein the access point comprises a transmitter configured to transmit the first signal.

12. The system of claim 11, wherein the first signal has a first random timing offset.

* * * * *